Nov. 6, 1956   J. V. KEITH   2,769,299
TWISTING AND WINDING MACHINE
Filed April 25, 1951   11 Sheets-Sheet 1

INVENTOR.
JOHN V. KEITH
BY
Albert P. Denis
ATTORNEY

Nov. 6, 1956  J. V. KEITH  2,769,299
TWISTING AND WINDING MACHINE
Filed April 25, 1951  11 Sheets-Sheet 3

INVENTOR.
JOHN V. KEITH
BY
ATTORNEY

Nov. 6, 1956  J. V. KEITH  2,769,299
TWISTING AND WINDING MACHINE
Filed April 25, 1951   11 Sheets-Sheet 6

INVENTOR.
JOHN V. KEITH
BY
ATTORNEY

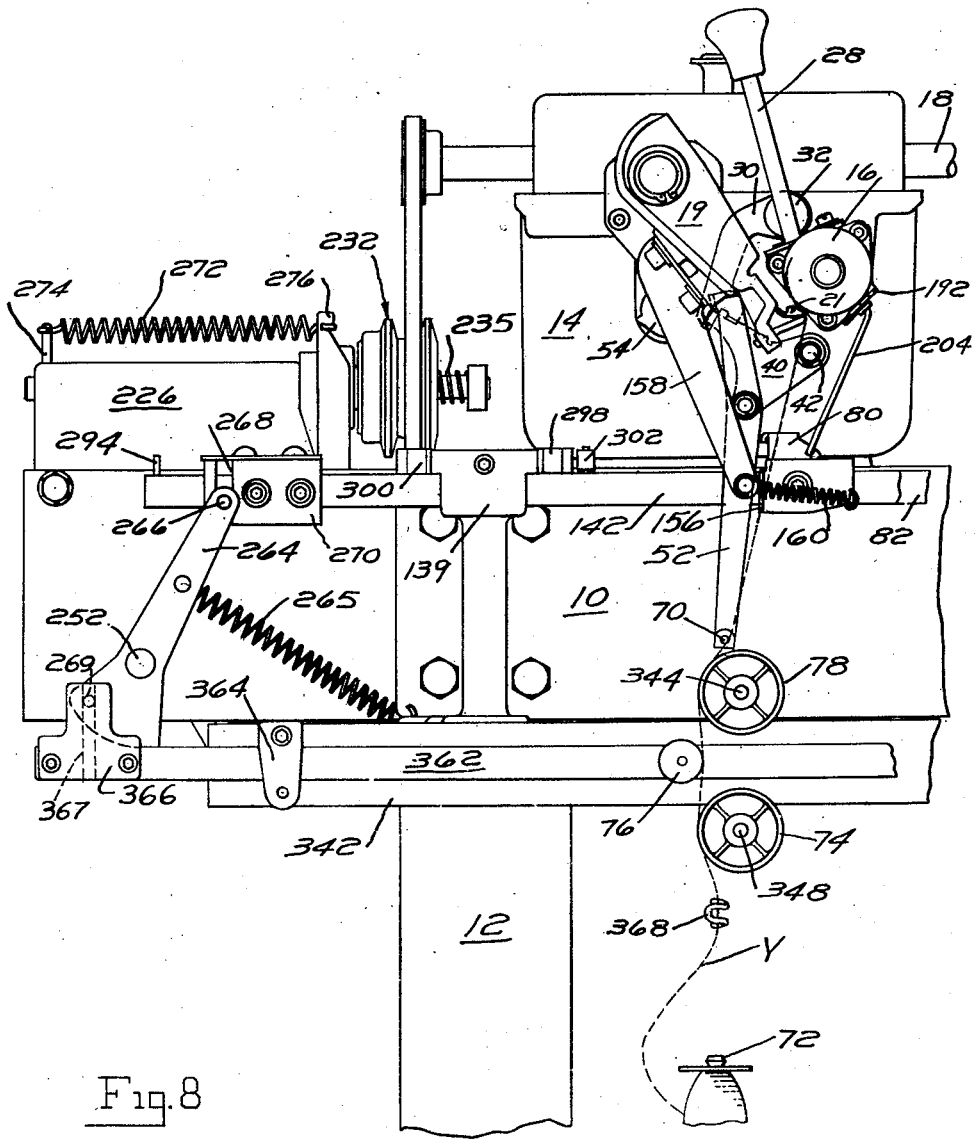

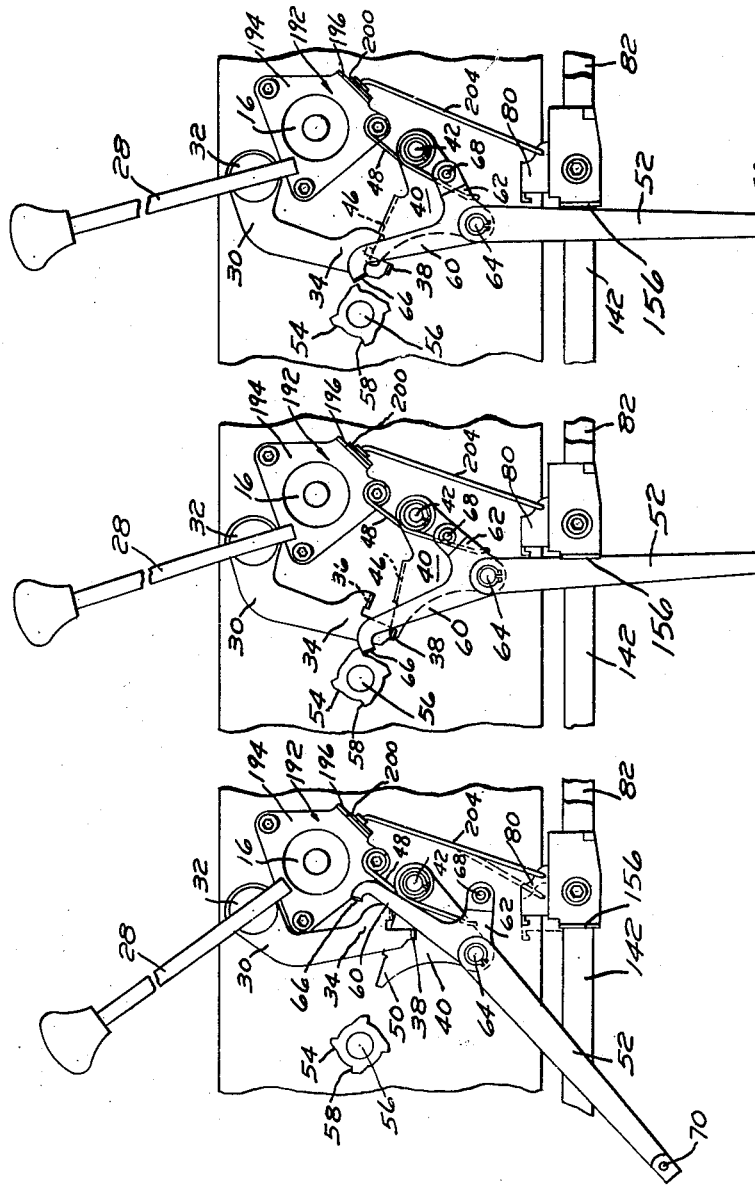

Nov. 6, 1956  J. V. KEITH  2,769,299

TWISTING AND WINDING MACHINE

Filed April 25, 1951  11 Sheets-Sheet 9

INVENTOR.
JOHN V. KEITH
BY
ATTORNEY

Nov. 6, 1956    J. V. KEITH    2,769,299
TWISTING AND WINDING MACHINE
Filed April 25, 1951    11 Sheets-Sheet 10

INVENTOR.
JOHN V. KEITH
BY
ATTORNEY

United States Patent Office 2,769,299
Patented Nov. 6, 1956

2,769,299

TWISTING AND WINDING MACHINE

John V. Keith, Warwick, R. I., assignor to Universal Winding Co., Cranston, R. I., a corporation of Massachusetts Application April 25, 1951, Serial No. 222,807

24 Claims. (Cl. 57—62)

This invention relates to a mechanism for twisting and winding strand material such as yarn, thread or the like and more particularly to such a machine wherein the twisted yarn is wound in a package capable of being shipped and/or used without further processing.

In the following specification and claims the term "yarn" is employed in a general sense to apply to all kinds of strand materials, either textile or otherwise, and the designation "package" is intended to mean the product of the winding machine whatever its form.

One object of the present invention is to provide a constant yarn speed winding machine.

Another object of the present invention is to provide a precision winder capable of winding a precision wound package at a substantially constant yarn speed.

Another object of the present invention is to provide a winding machine wherein the movement of the yarn traversing means away from the winding spindle is not caused by the growth of the package being wound.

Another object of the present invention is to provide a winding machine wherein the package of yarn wound thereby is subjected to a controlled pressure throughout its growth.

Another object of the present invention is to provide a winding machine wherein the yarn traversing means is positively moved away from the winding package.

Another object of the present invention is to provide a winding machine capable of winding a transfer-tail prior to winding a package.

Another object of the present invention is to provide a winding machine having means for winding a transfer-tail that is automatically reset in tail winding position by a subsequent operation in the cycle of the machine.

Another object of the present invention is to provide a winding machine having means for automatically stopping a winding spindle thereon in the event the yarn being wound thereby breaks or is exhausted.

Another object of the present invention is to provide a winding machine having means for progressively relieving the tension of the yarn being wound as the wound package increases in diameter.

Another object of the present invention is to provide a winding machine having a mechanism for automatically stopping individual winding spindles thereon in the event the yarn being wound is broken or exhausted and having means for preventing the operation of said stopping means when the winding machine is first started.

Another object of the present invention is to provide a winding machine having a mechanism for automatically stopping individual winding spindles thereon in the event the yarn being wound is broken or exhausted and having means for preventing the operation of said stopping means until the yarn being wound has attained a condition whereby it can hold said mechanism inoperative.

Another object of the present invention is to provide a machine for twisting yarn and for winding the twisted yarn into a package wherein the winding mechanism of said machine does not start to operate until the twisting portion thereof has come up to a predetermined speed.

Another object of the present invention is to provide a gang "don-doff" winding machine havinge means for quickly positioning all of the winding units thereon in condition for "doffing" and "donning."

Another object of the present invention is to provide a gang "don-doff" winding machine having means for quickly positioning all of the winding units thereon in starting position.

Another object of the present invention is to provide a gang "don-doff" winding machine having means for selectively quickly positioning the winding units thereof in the "doffing" and "donning" position or the starting position.

Another object of the present invention is to provide a winding machine wherein a single control unit operates to start the machine, stop it, moves its winding units to "doffing" position, and moves its winding units to starting position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 8 is a fragmentary elevational view of the "tail-end" of the machine showing one winding spindle and the means for resetting the tail winding mechanism;

Fig. 9 is a fragmentary elevational view partly in section showing the spindle stopping mechanism in its normal or running position;

Fig. 10 is a view similar to Fig. 9 but showing the stopping mechanism in the act of disengaging a spindle;

Fig. 11 is a view similar to Figs. 9 and 10 but showing the stopping mechanism after it has disengaged its spindle;

Figure 1:
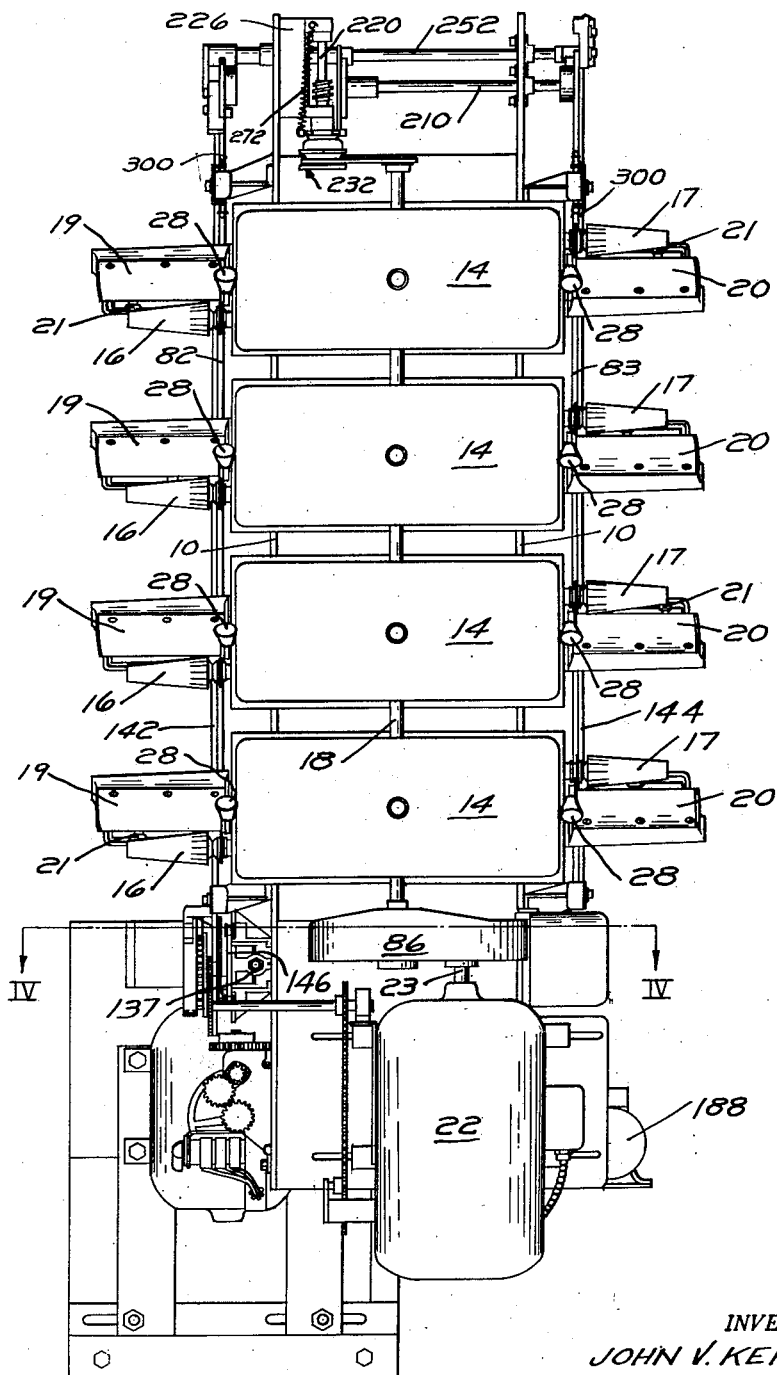
Figure 1 is a plan view of an apparatus embodying the present invention.

*General description.*—The present invention comprises an apparatus adapted to wind a strand of yarn at a substantially constant yarn speed to form a package and simultaneously with the winding operation insert a predetermined number of turns of twist per unit length in the yarn. The twisting part of the apparatus can be any convenient type of twisting spindle of the "uptwister" type. For example, the spindle may be of the more conventional single twist type spindle, or it may be any of the well known multiple twist type of spindle. The winding portion of the apparatus preferably comprises a precision winder capable of winding a precision wound package in either the shape of a cone or a tube.

The apparatus of the present invention may be broken down for convenience in describing and understanding the present invention into a plurality of groups of co-operating mechanisms. The first of these groups comprises the winding mechanism and includes a main variable speed driving motor, a plurality of winding spindles for winding strands of yarn into packages, a yarn guide for distributing the yarn being wound longitudinally of the winding spindle, and means for stopping the operation of an individual winding spindle and the yarn guide in the event the yarn being wound thereby breaks or is exhausted.

The second of these groups comprises a pressure control and motor speed control mechanism which includes means for positively moving the yarn guides away from the winding spindles as the packages increase in diameter to prevent said yarn guide from exerting excessive and unwanted pressure against the package being wound. The pressure control mechanism includes a plurality of cams driven by the main driving motor, one of which operates on means for retracting the yarn guide and another of which operates the speed control mechanism of the main driving motor.

The third of these groups comprises a resetting mechanism which is driven by a separate driving motor and upon the completion of the winding of a package disengages the main variable speed driving motor and then causes said separate motor to operate on the pressure control mechanism to first rapidly move the yarn guide away from the wound package to permit said packages to be "doffed" when fully wound to permit new package cores to be "donned" and to permit the apparatus to be threaded up for the next winding cycle. After the apparatus has been threaded up the resetting mechanism rapidly returns the pressure control mechanism to its starting position to place the yarn guides against the empty package cores and to return the main driving motor speed control to initial or starting position.

The fourth of these groups comprises a tail winding mechanism and includes a supplementary yarn guide, or hook, adjacent each winding spindle and means for operating each supplementary yarn guide, or hook, at the start of each operating cycle of the apparatus. A resetting mechanism, actuated by a portion of the pressure control mechanism, is provided for automatically resetting the supplementary yarn guides prior to the start of each operating cycle of the apparatus.

The fifth of these groups comprises a twisting mechanism which includes any convenient type of uptwister spindles driven at a predetermined constant speed by a separate twister driving motor.

The sixth of these groups comprises a tension control mechanism and includes a set of yarn tension relieving wheels, or rollers, driven by a separate motor, for co-operating with the yarn being wound on each winding spindle. Means are provided for increasing the amount of wrap of the yarn around these driven wheels, or rollers, as the package being wound increases in diameter so that the yarn is wound on the spindle at a controlled tension.

The seventh of these groups comprises the controls for the above groups of mechanisms to insure the operation of said groups of mechanisms in their proper time sequence and/or in synchronism with all of the other groups.

*Winding mechanism.*—The winding mechanism herein illustrated comprises a plurality of precision winding units 14 supported by a bed or table 10 resting on legs 12. Winding units 14 are spaced along a portion of said bed 10 and each has a winding spindle 16 projecting from its front end and a winding spindle 17 projecting from its back end. Winding spindles 16 and 17 of all of the winding units 14 are driven by line shaft 18 which passes through all of said winding units 14 and is rotatably journaled therein. Each winding unit 14 is also provided with a pivoted traverse frame 19 at its front end and a pivoted traverse frame 20 at its back end, each adapted to carry a yarn guide 21 adjacent its respective spindle 16 or 17 to traverse the yarn thereon in a well known manner. Yarn guides 21 may be reciprocated on traverse frames 19 and 20 in any convenient and well known manner to cause each guide 21 to reciprocate a fixed number of times for each revolution of its respective winding spindle 16 or 17, as for example by means of one or more cams located inside of the winding head 14 and also driven by line shaft 18.

Spindles 16 located on the front of the apparatus are substantially identical to spindles 17 located on the back of the apparatus, and traverse frames 19 are substantially identical to traverse frames 20. Therefore, when an operator is facing a winding unit at the front side of the machine, Figs. 2 and 8, spindle 16 is to the right of traverse frame 19 and said traverse frame 19 pivots in a clockwise direction, to move its yarn guide bearing lower edge towards the tail end of the apparatus, as said yarn guide recedes from spindle 16 as the package of yarn being wound thereon increases in diameter. The same relation of spindle to traverse frame holds true with spindle 17 and traverse frame 20. When the operator is facing a winding unit at the back of the machine spindle 17 is to the right of traverse frame 20. It will be seen that as traverse frame 20 pivots away from spindle 17 its lower edge moves towards the head end of the machine. This arrangement of the front and back spindles makes the operations required of an operator in tending the machine the same for both sides of the machine, and it also makes the front and back spindles and traverse frames interchangeable. However, this arrangement makes it necessary that the pressure control mechanism, to be explained in detail hereinafter, must move in one direction on the front side of the apparatus and in the opposite direction on the back.

Figure 4:
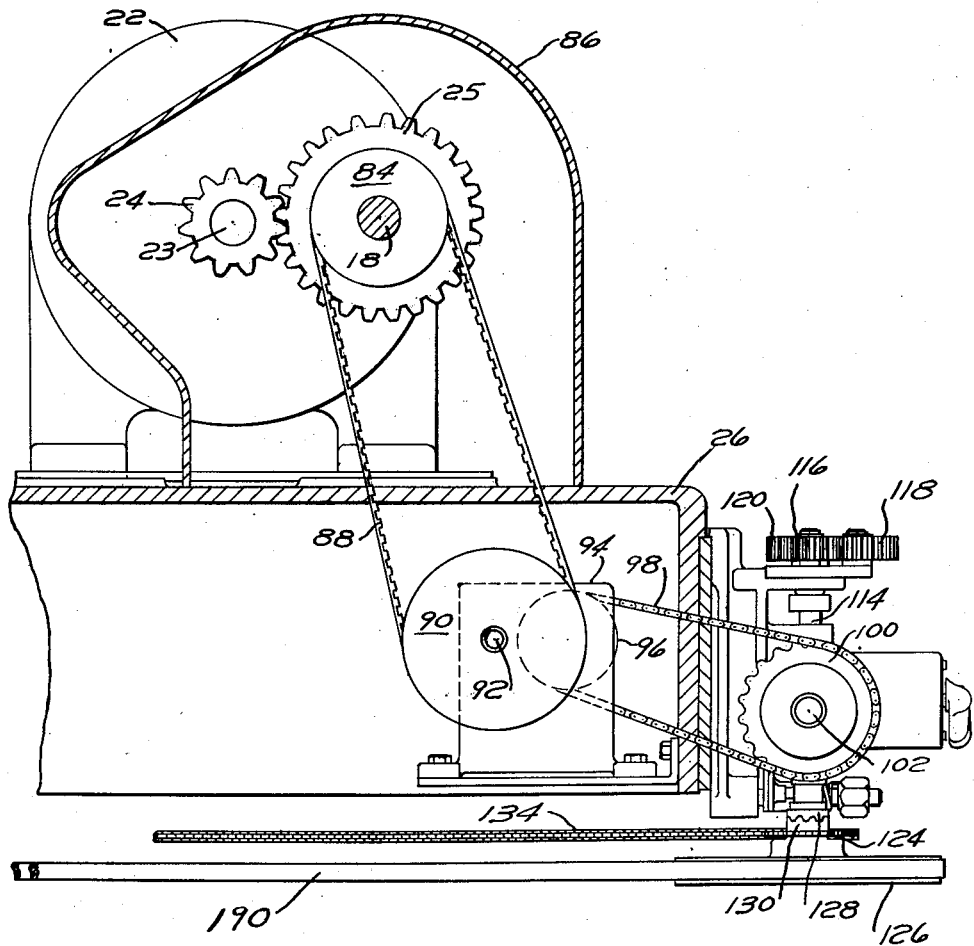
Fig. 4 is a fragmentary sectional view taken on the line IV—IV of Fig. 2 with the cam and lead screw omitted.

Line shaft 18 is driven by a variable speed electric motor 22 adjustably mounted on an extension 26 of bed or table 10. Motor 22 is connected to line shaft 18 by means of a pinion gear 24 carried by motor shaft 23, Fig. 4, which meshes with speed change gear 25 carried by line shaft 18. Different diameter gears can be substituted for gear 25 to increase or decrease the winding speed of spindles 16 and 17 to thereby decrease or increase the amount of twist imparted to the yarn being wound. Motor 22 is slidable on extension 26 to permit pinion 24 to be brought into mesh with different diameter gears placed on shaft 18.

Spindles 16 and 17 and yarn guides 21 are adapted to be connected to line shaft 18 by means of suitable gearing and clutch members, not shown, located inside of the casing of winding units 14. Each spindle is provided with a starting lever 28, Figs. 8 through 11, which is connected to the clutch member within the winding unit housing by shaft 32 and is adapted, upon swinging motion thereof in a clockwise direction, as viewed in Fig. 8, to engage its respective clutch to bring about the rotation of its spindle and the reciprocation of its yarn guide.

A "knock-off" mechanism, Figs. 9, 10 and 11, is provided at each end of each winding unit 14 adapted to disengage the clutch of a particular spindle in the event the yarn it is winding breaks or is exhausted to thereby stop the rotation of the spindle and the reciprocation of the yarn guide to eliminate any possibility that the wound yarn will be damaged by continual rubbing of the yarn guide.

The "knock-off" mechanism comprises an elbow-shaped lever 30 rigidly attached to shaft 32. Shaft 32 is adapted to be rotated by starting lever 28 in a clockwise direction, as viewed in Figs. 8 to 11, to engage the clutch, not shown, to start the rotation of winding spindle 16 and the reciprocation of yarn guide 21. Shaft 32 is spring loaded, by means of a spring not shown, to rotate in a counterclockwise direction, as viewed in Figs. 8 to 11, to disengage said clutch. Elbow-shaped lever 30 is bifurcated at its lower end 34 to form two fingers. One of these fingers is bent rearwardly at right angles to lever 30 to form a latch shoulder 36, see Fig. 10, the other finger is bent forwardly at its tip to form breakage lever engaging lug 38. A generally triangular shaped latch keeper member 40 is pivoted at one apex of the triangle on stud 42 located beneath spindle 16. The uppermost edge of keeper member 40 is provided with a rearwardly bent shoulder or flange 46 which is adapted to cooperate with latch shoulder 36 to maintain elbow-shaped lever 30 in its raised or clutch engaging position. Latch keeper member 40 is spring urged in a clockwise direction by means of spiral spring 48 which encircles stud 42 and has one of its ends attached to one of the bolts which secures the supplementary thread guide or tailing hook to the winding unit and its other end engaging the lowermost edge of keeper member 40. Elbow-shaped lever 30 and latch keeper member 40 are so proportioned that when they are in their unlatched or disengaged position, the bottom of latch shoulder 36 engages the upper surface of the shoulder or flange 46 on keeper member 40 and restrains it against further clockwise rotation under the influence of spring 48. It will thus be seen that as starting lever 28 is swung in a clockwise direction from the position illustrated in Fig. 11 to the position illustrated in Fig. 9, the bottom surface of latch shoulder 36 will slide along the upper surface of shoulder or flange 46 to cam latch keeper member 40 in a counterclockwise direction against the action of spring 48 until such time as latch shoulder 36 passes beyond shoulder or flange 46. When shoulder 36 passes beyond shoulder or flange 46, spring 48 immediately moves latch keeper member 40 in a clockwise direction until stop lug 50, which forms the second apex of triangular latch keeper member 40, engages the under surface of latch shoulder 36. This brings the left hand edge of shoulder or flange 46 opposite the right hand edge of latch shoulder 36 to effectively prevent elbow-shaped lever 30 from returning to its clutch disengaged position.

A breakage lever 52 pivoted intermediate its ends to the third apex of latch keeper member 40 is adapted to disengage shoulder or flange 46 from latch shoulder 36 upon the breakage or exhaustion of yarn being wound to permit elbow-shaped lever 30 to swing in a counterclockwise direction to the position illustrated in Fig. 11 to stop the rotation of spindle 16 and the reciprocation of yarn guide 21. A continuously clockwise rotating star wheel 54 is located on each end of the housing of each winding unit 14 adjacent the lower end 34 of elbow-shaped lever 30. The star wheel 54 is preferably mounted on a shaft 56 which passes into the winding unit housing and is positively driven from line shaft 18 by any suitable means. Each star wheel 54 has a substantially radial shoulder 58 formed on each of the projections thereof. The breakage lever 52 is generally Y-shaped and is pivoted adjacent the junction of its upper arms 60 and 62 to latch keeper member 40 by means of a suitable stud 64. The upper end of left hand arm 60 of breakage lever 52 is bent over to form a star wheel engaging abutment 66. The upper end of right hand arm 62 of breakage lever 52 is provided with a pin or stud 68 adapted to carry counterbalancing weights to permit said breakage lever to be balanced so that it can be controlled by any given yarn tension. The lower end of breakage lever 52 is provided with a forwardly extending yarn engaging bar 70 adapted to engage the yarn being wound on spindle 16 to maintain breakage lever 52 in the position illustrated in Fig. 9 whereby star wheel engaging abutment 66 is held away from and out of engagement with said star wheel.

In a normal twisting and winding operation a strand of yarn Y passes upwardly from a twister spindle 72 (see Fig. 8) between tension controlling rollers 74, 76 and 78 to be explained in detail hereinafter, and thence upwardly to be engaged by yarn guide 21 and wound onto spindle 16. Yarn engaging bar 70 contacts the running strand of yarn adjacent tension controlling roller 78 and is held thereby against swinging in a counterclockwise direction to prevent star wheel engaging abutment 66 from contacting radial shoulders 58 on said star wheel. Upon the breakage of the strand of yarn Y, or the exhaustion of the supply of yarn carried by twister spindle 72, Figs. 8 and 15, the restraint on breakage lever 52 is removed and said lever pivots from the position illustrated in Figs. 8 and 9 to the position illustrated in Fig. 10 wherein its star wheel engaging abutment 66 passes under and is struck an impelling blow by one of the radial shoulders 58 on star wheel 54. The blow by shoulder 58 depresses breakage lever 52 to thereby pivot latch keeper member 40 in a counterclockwise direction to release the latch shoulder 36, on elbow-shaped lever 30, from shoulder or flange 46, on latch keeper member 40. Fig. 10 illustrates the position the elements on the knock-off member assume the instant shoulders 36 and 46 have separated. Immediately upon the separation of shoulders 36 and 46, elbow-shaped lever 30 rotates in a counterclockwise direction to the position illustrated in Fig. 11 thus releasing the clutch member inside of the winding unit housing to stop the rotation of spindle 16 and the traversing motion of yarn guide 21. As elbow-shaped lever 30 swings in its counterclockwise movement, forwardly extending breakage lever engaging lug 38 on said elbow-shaped lever contacts the edge of upper arm 60 of breakage lever 52 thereby rotating said breakage lever and star wheel engaging abutment 66 located thereon out of the circumferential path of the radial shoulders 58 of the star wheel. As soon as abutment 66 is released from shoulder 58 of star wheel 54 latch keeper member 40 pivots upwardly under the influence of spiral spring 48 to bring the upper surface of shoulder or flange 46 into engagement with the lower surface of latch shoulder 36 of elbow-shaped lever 30.

When winding is started on an empty package core the present apparatus first winds a "transfer-tail" by means of a supplementary or transfer tail winding yarn guide, to be explained in detail hereinafter, following which the strand of yarn is released by the supplementary yarn guide and is picked up by a self threading yarn guide 21 which thereafter traverses the yarn across the length of the package. During the winding of the transfer tail there is likely to be some slack in the running strand of yarn, and the instant the strand is dropped by the supplementary yarn guide a considerable amount of slack is introduced into the running strand that requires an appreciable length of time to be removed by winding spindle 16. To prevent the presence of this slack in the running strand of yarn from permitting breakage lever 52 to swing into engagement with star wheel 54, a moving abutment 80, Figs. 8, 9, 10 and 11, is provided which is so positioned on the supplementary or tail winding guide operating bars 82 and 83, which will also be described in detail hereinafter, that it engages the lower end of breakage lever 52 during the initial period of winding while the above mentioned slack is present in the running strand of yarn Y to hold said breakage lever out of engagement with star wheel 54 until such time as the strand of yarn Y is under sufficient tension to perform this function. When the running strand of yarn Y has been placed under sufficient tension to support breakage lever 52 out of engagement with star wheel 54, abutment 80 is moved away therefrom and in the event of yarn breakage or exhaustion, the knock-off mechanism functions in the above described manner.

The speed of variable speed electric motor 22 is reduced throughout the winding cycle at a predetermined rate to thereby maintain the speed at which yarn is wound at a substantially constant rate by means of a mechanism that operates in conjunction with the pressure controlling mechanism to be next described.

*Pressure control and motor speed control mechanism.*—The pressure control and motor speed control mechanism, see Figs. 2, 3, 4, 5 and 6, of the present apparatus is driven by motor 22 by means of toothed pulley 84 fixedly attached to line shaft 18 inside of housing 86, cogged belt 88 and toothed pulley 90 is fixedly attached to the input shaft 92 of a speed reducing unit 94 supported by extension 26 of bed or table 10. The output shaft of speed reducing unit 94 carries a sprocket wheel 96 which through sprocket chain 98 drives sprocket wheel 100 carried by shaft 102. Shaft 102 is suitably journaled in bearings 104 and 106 on extension 26. A bevel gear 110 is fixedly attached to shaft 102 and meshes with bevel gear 112 carried by the lower end of vertical shaft 114 suitably journaled in bearings on extension 26. A pinion gear 116 carried by the upper end of shaft 114 acting through intermediate gear 118 rotatably mounted on a suitable stud shaft drives gear 120 carried by the upper end of vertical shaft 122 also suitably journaled in bearings provided on extension 26. Gears 116, 118 and 120 comprise a set of "denier change gears" to permit adjusting the rate at which the pressure control mechanism operates with respect to the motor speed to thereby permit the apparatus with respect to the motor speed to thereby permit the apparatus to be adjusted to operate on yarns of different diameters or deniers.

A sprocket wheel 124 is mounted on the lower end of vertical shaft 122 and is capable of rotating freely thereon. A pulley 126 is coupled to sprocket wheel 124 so that the two turn as a unit. A splined type clutch member 128 is keyed to shaft 122 adjacent sprocket wheel 124 for sliding movement longitudinally of said shaft and for rotation thereby. A second splined member 130 is attached to the hub of sprocket wheel 124 and is adapted to cooperate with splined clutch member 128 whereby vertical shaft 122 can selectively drive sprocket wheel 124. Clutch member 128 is adapted to be moved longitudinally of vertical shaft 122 to selectively engage or disengage the two clutch members by means of a bell crank lever 132 the operation of which will be explained hereinafter. Sprocket wheel 124 in turn drives sprocket chain 134. Sprocket chain 134 engages a sprocket wheel 136 fixedly attached to the lower end of a lead screw 138 located on the front side of the machine and a similar sprocket wheel attached to a similar lead screw 140 on the back side of the apparatus. It will, therefore, be seen that motor 22, acting through gears 24 and 25, shaft 18, pulleys 84 and 90 and belt 88, speed reducer 94, sprocket wheels 96 and 100, the denier change gears and sprocket wheel 124, and sprocket chain, 134, rotates lead screws 138 and 140.

All of the traverse frames 19 on the front side of the winding machine and traverse frames 20 on the back side of the winding machine are moved away from their respective winding spindles 16 and 17 simultaneously by means of a pair of pressure control bars 142 and 144. Pressure control bar 142 extends in a horizontal plane substantially throughout the length of bed 10 and is supported by journals 139 beneath winding spindles 16 adjacent the front ends of the housings of winding units 14 for longitudinal sliding movement. Pressure control bar 144 is similar to bar 142 but it extends along the back side of the apparatus in the same manner that said bar 142 extends along the front. Inasmuch as pressure control bars 142 and 144 are substantially identical except for the direction in which they move in controlling traverse frames 19 and 20, made necessary by the above mentioned right and left hand arrangement of the winding positions on the front and back of the machine with respect to each other, pressure control bar 142 extending along the front of the apparatus will be described in detail and the manner by which a reverse motion of pressure control bar 144 is obtained will be subsequently explained. As above explained, lead screw 138 is rotated a predetermined amount, controlled by denier change gears 116, 118 and 120, for every revolution that motor 22 makes. The rotation of lead screw 138 is employed to slowly lift a cam carrying plate 146 by means of a nut 137, Figs. 1 and 5, carried by said plate in threaded engagement with lead screw 138. Cam plate 146 is guided in its vertical motion by means of four guide rollers 148, Figs. 2 and 5, carried by the extension 26 of bed or table 10. A diagonal cam slot is formed on plate 146 by means of two cam forming rails 150 and 152 rigidly affixed to the surface of plate 146 in spaced relation to each other. The cam slot thus formed is adapted to receive cam following roller 154 carried by the adjacent end of pressure control bar 142.

A traverse frame moving abutment 156, Figs. 2, 8, 9, 10 and 11, is adjustably affixed to pressure control bar 142 adjacent each winding spindle 16. An arm 158 is fixedly secured to each traverse frame and extends downwardly therefrom and into engagement with one end of traverse frame moving abutment 156. A spring 160 resiliently holds the lower end of arm 158 against abutment 156. It will, therefore, be seen that as motor 22 rotates lead screw 138 and lead screw 138 raises cam carrying plate 146, the action of the cam surface formed by cam forming rail 150 will move cam follower 154 and pressure control bar 142 to the left, as viewed in Fig. 2, and that such movement will cause abutments 156 acting through arms 158 to pivot traverse frames 19 away from their respective spindles. It will be readily understood by those skilled in the art that rail 150 can be provided with such a cam surface so that by employing the proper combination of denier change gears 116, 118 and 120, pressure control bar 142 can be caused to move traverse frame 19 and yarn guide 21 away from the winding spindle 16 at substantially the same rate as the radius of the package being wound increases due to successive layers of yarn being added thereto or at a faster or slower rate. By positively moving yarn guide 21 away from the package being wound the pressure exerted by said yarn guide on the package can be controlled throughout the winding cycle to thereby control the shape, construction and quality of the package.

As mentioned above, pressure control bar 144 is located on the back of the machine and is similar to and functions in the same manner as bar 142 in moving its adjacent traverse frames 20 away from spindles 17 except that instead of moving from the head-end of the machine, i. e. the end carrying motor 22, towards the tail-end of the machine it moves from the tail-end of the machine towards the head-end. This opposite motion is obtained by providing cam carrying plate 147, Fig. 3, which is moved vertically by lead screw 140 in the same manner that plate 146 is moved by lead screw 138, with a pair of cam forming rails inclined in a direction to give the proper lineal movement to said bar 144.

Figure 2:
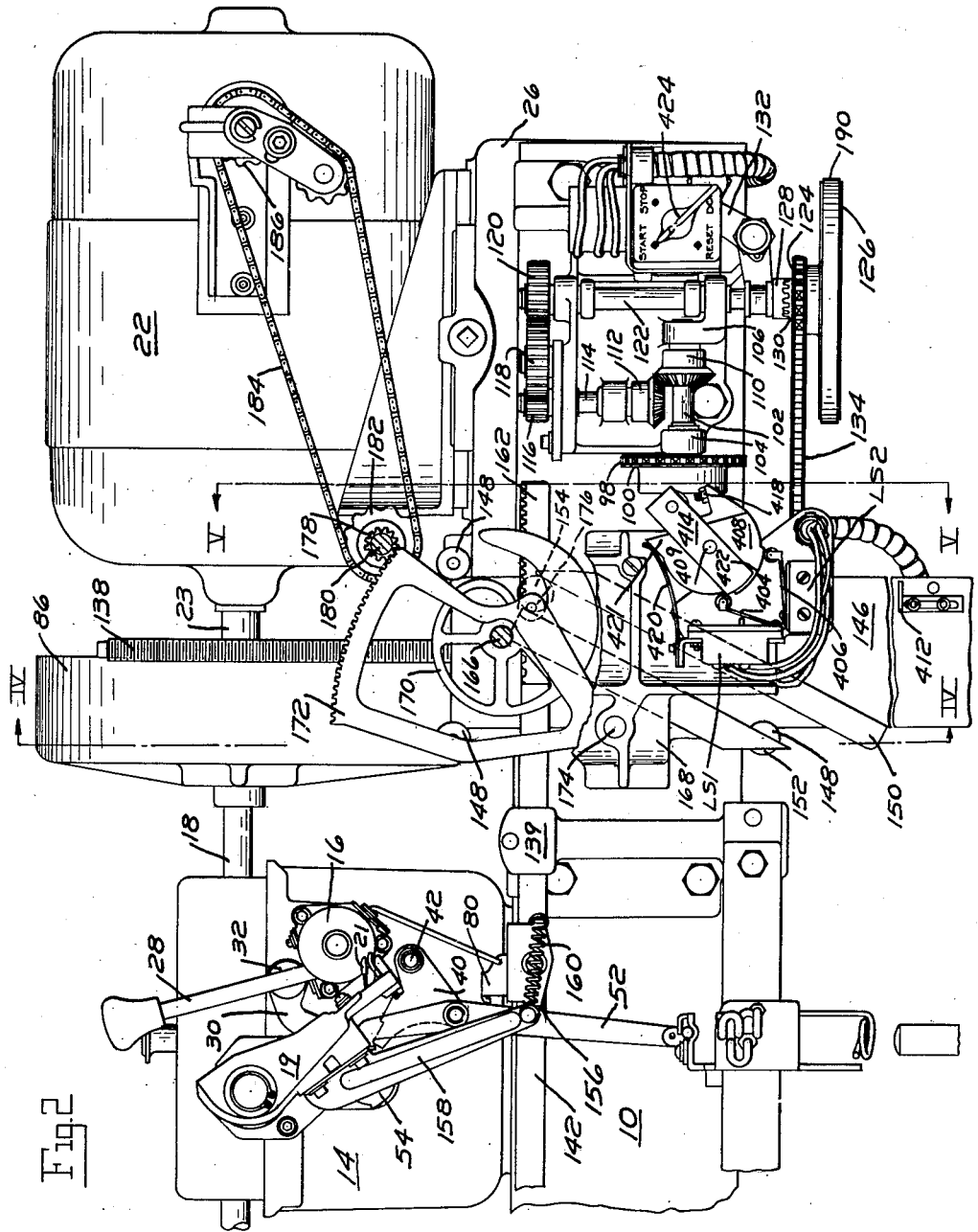
Fig. 2 is a fragmentary elevational view with parts broken away of the driving head of the apparatus and one of the winding units.
Figure 3:
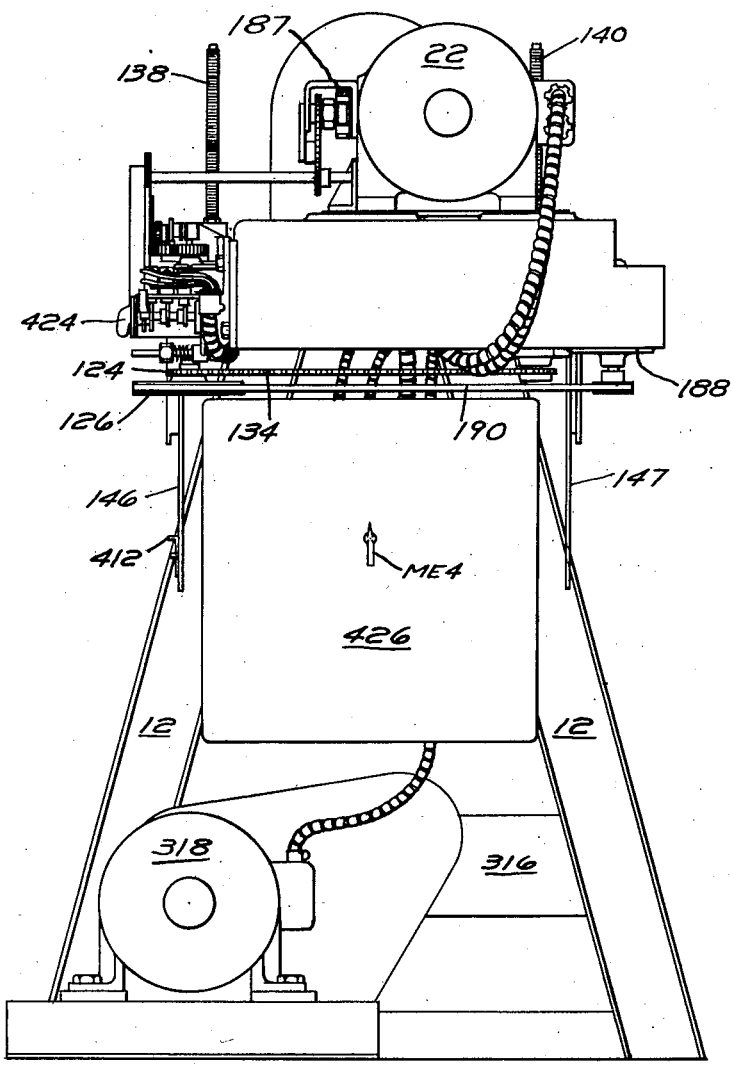
Fig. 3 is an end view of the head end of the apparatus.

A pair of limit switches LS1 and LS2, Figs. 2 and 5, the functions of which will be explained in detail hereinafter, are actuated by cam carrying plate 146. Limit switch LS1 is actuated during the last portion of its movement in both the upward and downward direction, and limit switch LS2 is actuated during the first portion of its upward movement and the last portion of its downward movement. Limit switches LS1 and LS2 are carried by bridging member 168 in a position to have their actuating arms 404 and 406 respectively engage the periphery of switch actuating cam 408. Cam 408 is mounted for pivotal movement on stub shaft 409, and is provided with an abutment 410 on its rear side adapted to be engaged by an actuating shoulder 412 located adjacent the lower end of cam carrying plate 146 and an actuating pin 413 located adjacent its upper end. The periphery of cam 408 is provided with a switch actuating shoulder 422 and a loke 421. A keeper member 414 comprising a flat strip of material is pivotally mounted on stub shaft 409 adjacent the face of switch actuating cam 408. The left end of keeper member 414, as viewed in Fig. 2, is adapted to engage the actuating arm 404 of switch LS1, in a manner to be explained hereinafter, and its right end is provided with a weight 416 which is adapted to be engaged by adjusting screw 418 on switch actuating cam 408. A leaf spring 420 having one of its ends attached to bridging member 168 bears against the periphery of cam 408 to react against lobe 421 thereon upon initial upward movement of cam carrying plate 146 to rotate said cam 408 a slight amount in a clockwise direction to move shoulder 422 off arm 406 of switch LS2 to open said switch. Limit switch LS2 is a single pole single throw switch and the movement of its actuating arm 406 off cam shoulder 422 opens said switch LS2 to break a circuit and to thereby make it impossible to start motor 22 until switch LS2 has been again closed. Following the slight rotation of cam 408 by spring 420 the spring frictionally holds said cam against rotation until it is engaged and moved by either actuating pin 413 or actuating shoulder 412.

As cam carrying plate 146 approaches its uppermost limit of movement, actuating shoulder 412 thereon contacts the lower side of abutment 410 on switch actuating cam 408 to thereby rotate said cam in a clockwise direction as viewed in Fig. 2. Clockwise rotation of cam 408 brings its shoulder 422 against actuating arm 404 of limit switch LS1. It should be noted that until shoulder 422 moves arm 404 of switch LS1 that arm has been in engagement with the edge of keeper member 414 and has held said keeper member 414 against rotation. As shoulder 422 passes over and moves arm 404 of switch LS1 keeper member 414 is released from said arm and rotates in a clockwise direction under the influence of its weight 416 until said weight engages adjusting screw 418. Limit switch LS2 is a single pole single throw switch and the movement of its actuating arm 406 off cam shoulder 422 opens said switch to break a circuit and to thereby make it impossible to start motor 22 until switch LS2 has been again closed. Limit switch LS1 is a single pole double throw switch and the movement of its actuating arm 404 occasioned by its passing up onto shoulder 422 breaks the circuit of a reversing motor 188, to be explained more in detail hereinafter, and closes a second circuit to permit said motor 188 to operate in a reverse direction upon the manipulation of yet another switch, all of which will be explained in detail hereinafter. As cam carrying plate 146 approaches its lowermost position, actuating pin 413 carried thereby, engages the upper surface of abutment 410 of switch actuating cam 408 and continued downward movement of said cam carrying plate 146 rotates cam 408 in a counterclockwise direction. Counterclockwise rotation of cam 408 causes shoulder 422 to pass off the actuating arm 404 of limit switch LS1 to cause said arm 404 to rest against the end of keeper member 414. The end of keeper member 414 extends beyond the periphery of cam 408 a sufficient distance to prevent actuating arm 404 from moving far enough as it passes off shoulder 422 and onto the end of keeper member 414 to open said switch LS1 to stop motor 188. Continued counterclockwise rotation of cam 408 causes shoulder 422 to pass over actuating arm 406 of limit switch LS2 to close said switch to make it possible to start motor 22, in a subsequent operation, and causes arm 404 to pass off from the end of keeper member 414 to break the circuit to motor 188. It will be noted that there is a form of adjustable lost motion action, so far as the actuation of limit switch LS1 is concerned, brought about by keeper member 414. As cam 408 is rotated in a clockwise direction, in the above described manner, actuating arm 404 of switch LS1 engages the edge of said keeper member and holds it against rotation with said cam 408 until such time as arm 404 is engaged and moved by shoulder 422 of said cam. Movement of arm 404 by shoulder 422 releases said arm from keeper member 414 permitting it to rotate in a clockwise direction under the influence of its weight 416 to bring said weight against adjusting screw 418. Upon counterclockwise movement of cam 408 keeper member 414 is positively rotated by reason of adjusting screw 418 pressing against weight 416. Therefore, very fine adjustment of the actuation of switch LS1 by the downward movement of cam carrying plate 146 may be made by manipulating adjusting screw 418.

Motor 22 is provided with a speed control, preferably in the form of movable brushes, that is regulated by a mechanism actuated by the above described pressure control mechanism to control the speed of said motor in such a manner as to drive spindles 16 and 17 at a rate of speed which will cause the yarn being wound on the spindles to have a substantially constant take-up speed regardless of the size of the package. The head end of pressure control bar 142 is provided with a rack bar 162, Figs. 2 and 5, that is in mesh with pinion gear 164 rotatably journaled on stub shaft 166. Stub shaft 166 is fixedly attached at one end to bridging member 168 and carries roller 167 adjacent its other end and in engagement with the top surface of pressure control bar 142 to serve as a guide for said bar. A spiral cam 170 is fixedly carried by the hub of pinion gear 164 for rotation with said gear 164. A gear segment 172 is pivotally mounted on a second stub shaft 174 also carried by bridging member 168. Gear segment 172 is located adjacent spiral cam 170 and carries a cam following roller 176 which engages the camming surface of said spiral cam 170 whereby rotation of cam 170 in a clockwise direction as viewed in Fig. 2, pivots segment 172 in a clockwise direction following which counterclockwise rotation of cam 170 permits the return segment 172 to its original position. Gear segment 172 is in mesh with gear 178 fixedly attached to shaft 180 which has one of its ends journaled in bridging member 168 and its other end journaled on extension 26 of the bed or table 10. A sprocket wheel 182 is fixedly mounted on shaft 180 and through sprocket chain 184 drives sprocket wheel 186 carried by the brush shifting mechanism of motor 22. It will thus be seen that as winding progresses and cam carrying plate 146 is lifted by lead screw 138, pressure control bar 142 is moved towards the tail end of the machine and thereby moves the traverse frames 19 and yarn guides 21 away from winding spindles 16. At the same time pressure control bar 142 moves rack bar 162 beneath pinion gear 164 to rotate said pinion and with it rotate spiral cam 170 in a clockwise direction. Clockwise rotation of spiral cam 170 pivots gear segment 172 also in a clockwise direction and the swinging or pivoting of gear segment 172 acting through gear 178, sprocket wheels 182 and 186, and sprocket chain 184 actuate the brush shifting mechanism to slow down motor 22. Upon the return of cam carrying plate 146 to its original lowered position, and with it the return of pressure control bar 142 and spiral cam 170, in a manner to be described hereinafter, a clock type spring 187, forming a part of the brush shifting mechanism of motor 122, returns said brush shifting mechanism to its starting position and returns gear segment 172 to its starting position, illustrated in Fig. 2.

*Doff and reset mechanism.*—After the spindles 16 and 17 have completed the winding of a package, it is highly desirable that traverse frames 19 and 20 be moved away from the completed packages of yarn to permit said packages to be readily withdrawn from spindles 16 and 17 and to thereby minimize the danger that the yarn thereon be damaged by contact with said traverse frames in the doffing operation, and to facilitate placing a new package core on the spindle and threading up preparatory to starting a new twisting and winding cycle. It is also desirable that traverse frames 19 and 20 be rapidly moved back to their starting position wherein yarn guides 21 are in contact with the package cores or closely adjacent thereto after the apparatus has been threaded up. To provide this desirable movement of the traverse frames away from the completed packages and to bring said traverse frames back into starting position, the apparatus of the present invention is provided with a separate "doff" and reset mechanism. The "doffing" and resetting mechanism is powered by a separate reversing electric motor 188, Fig. 3, carried by extension 26. Motor 188 is coupled to pulley 126, Figs. 2, 3 and 4, by means of belt 190. As explained above, pulley 126 and sprocket wheel 124 are connected to each other and the two are mounted on vertical shaft 122 for rotation thereon. It will, therefore, be seen that motor 22 can be stopped and that sprocket wheel 124 and pulley 126 can be disconnected from motor 22 so that they can rotate independently on shaft 122 by operating bell crank lever 132 in a manner to be explained in detail hereinafter to thereby release splined clutch member 128 from the splined portion of sprocket wheel 124. After sprocket wheel 124 and pulley 126 have been disconnected from motor 22 by means of opening the splined clutch, reversing motor 188 is operated in a first direction to cause sprocket wheel 124, operating through sprocket chain 134, to rotate lead screws 138 and 140 in a direction to continue to lift cam carrying plates 146 and 147 respectively and thereby continue to move pressure control bars 142 and 144 in a direction to pivot traverse frames 19 and 20 away from the wound packages. Inasmuch as motor 188 is not operating through any great speed reduction, the additional movement of traverse frames 19 and 20 imparted thereby will be at a relatively rapid rate. After the package cores have been placed on spindles 16 and 17 and the spindles threaded up, motor 188 is operated in the other direction to thereby rotate lead screws 138 and 140 in a direction to lower cam carrying plates 146 and 147 to bring traverse frames 19 and 20 into their starting position and to return the speed control mechanism of motor 22 to its starting position.

*Transfer tail-winding mechanism.*—It is desirable in winding a package of yarn to first wind a few turns of yarn adjacent the base end of the package core and outside of that area of said core on which the yarn will be wound to form a package. These initial few turns of yarn are available for tying to the leading end of the yarn on another package when the finished packages of yarn are used in a subsequent operation to thus magazine two or more packages of yarn. The apparatus of the present invention is provided with a supplementary or tail-winding yarn guide 192 adjacent each winding spindle, Figs. 7, 8, 9, 10 and 11, for the purpose of winding such a transfer tail. Supplementary yarn guide 192 comprises a plate-like member 194 attached to the front and back ends of each housing of each winding unit 14 and having an opening therein through which spindle 16 or 17 projects. A flange 196 is bent forwardly from plate-like member 194 at a level beneath spindle 16 and on the opposite side of said spindle from yarn guide 21. A yarn-supporting shoulder 198 is formed on the forward edge of flange 196. A yarn-engaging and traversing lever 200 is pivoted intermediate its ends on flange 196 and has one of its ends formed in a hook 202 which is adapted to overlie and project above yarn-supporting shoulder 198. The other end of lever 200 has attached thereto the upper end of an operating rod 204. The lower end of operating rod 204 is attached to the abutment 80 carried by tail-winding guide operating bar 82.

The supplementary or tail-winding yarn guide operates in the following manner. At the start of the winding operation tail-winding guide operating bar 82 and abutments 80 are located in their leftmost position, shown in dotted lines on Fig. 11, to cause operating rod 204 to bring lever 200 into the position illustrated in Fig. 7 wherein the tip of hook 202 extends above yarn-supporting shoulder 198. In threading up each spindle the operator brings each respective strand of yarn up and passes it over yarn-supporting shoulder 198 and attaches it to the empty package core in the manner illustrated in Fig. 7. Hook 202 engages the strand of yarn and prevents it from dropping off said shoulder. When the winding machine is started to commence the winding operation, hook 200 retains the strand of yarn adjacent the end of the package core and causes said strand of yarn to wind thereon in the form of a transfer tail. At the same time tail-winding guide operating bar 82 is moved to the right, as viewed in Figs. 8 through 11, by a mechanism to be described in detail hereinafter, to cause operating rod 204 to rotate lever 200 in a counterclockwise direction, as viewed in Fig. 7, causing hook 202 to be lowered below the level of shoulder 198. Lowering hook 202 permits the strand of yarn Y to slide off yarn-supporting shoulder 198 and move out into the central part of the yarn core where it is picked up by yarn guide 21 which then traverses the yarn along the core during the rest of the winding operation.

Figure 12:
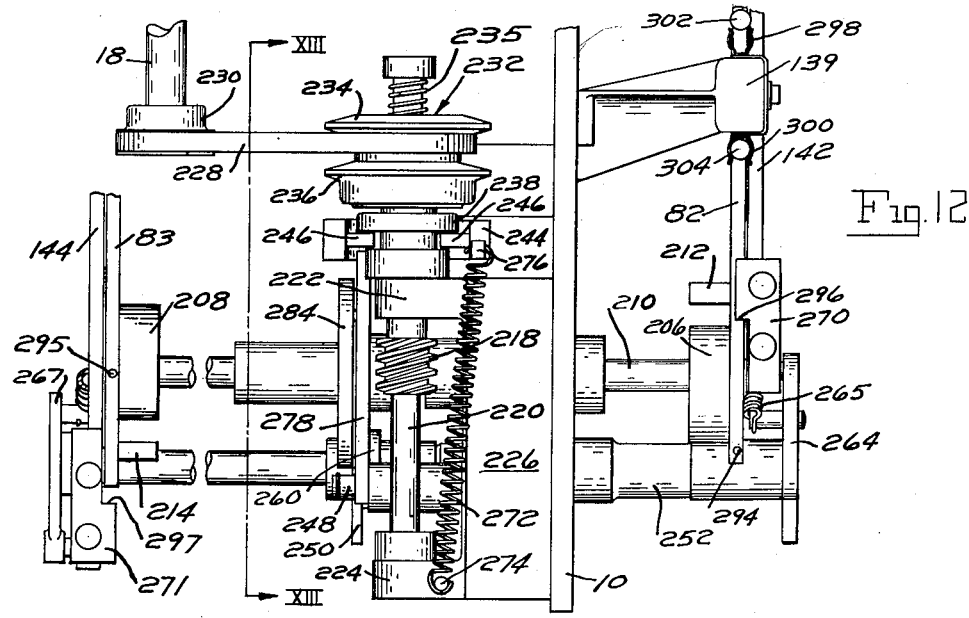
Fig. 12 is a fragmentary plan view of the means for resetting the tailing mechanism.
Figure 13:
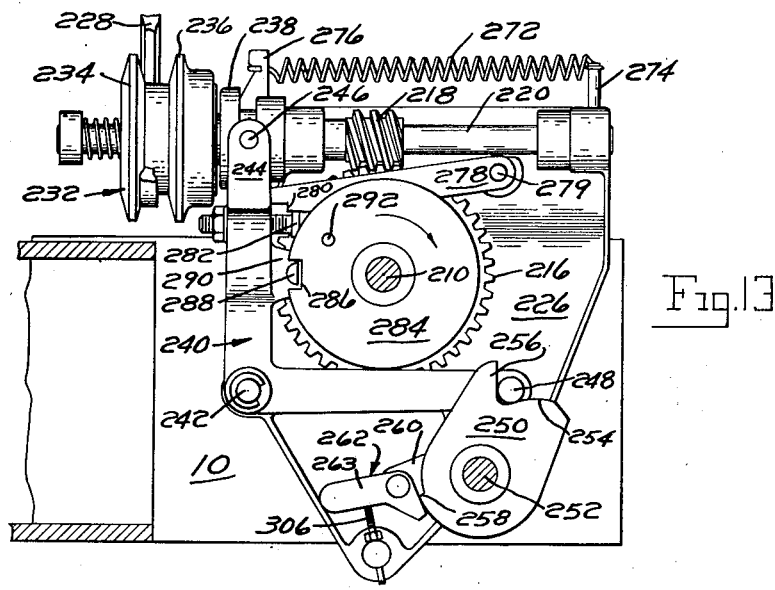
Fig. 13 is a sectional view taken on the line XIII—XIII of Fig. 12.

Tail-winding guide operating bar 82 is actuated at the start of each winding cycle by a mechanism mounted on bed or table 10 at the tail end of the apparatus, Figs. 8, 12 and 13. This mechanism is adapted to move operating bar 82 located on the front side of the apparatus in a direction towards the head end of the machine to rotate yarn-engaging and traversing lever 200 in a counterclockwise direction to thereby lower hook 202 below the level of yarn-supporting shoulder 198 and to move abutments 80 away from breakage lever 52. The mechanism is also adapted to move the tail-winding guide operating bar 83 located on the back side of the apparatus towards the tail end of the machine to perform the same operations. It will be understood that it is necessary for the operating bars 82 and 83 located on the front and back sides of the apparatus to move in opposite directions for the same reason that it is necessary for pressure control bars 142 and 144 to move in opposite directions, i. e. the right and left hand location of traverse frames 19 and 20 with respect to winding spindles 16 and 17 when viewed from the same side of the apparatus. The apparatus for actuating operating bars 82 and 83 comprises a pair of cams 206 and 208, Figs. 12 and 13, carried by shaft 210 suitably journaled in bed or table 10. Shaft 210 and cams 206 and 208 are adapted to make one complete revolution at the start of each winding cycle to permit cams 206 and 208 to react against cam followers 212 and 214 respectively carried by operating bars 82 and 83 to thereby move said bars 82 and 83 from a starting position to the normal winding position, illustrated in Figs. 2 and 8 through 12. Cams 206 and 208 are so shaped that bars 82 and 83 are moved slowly at first, to cause very little movement of lever 200. This permits the first few turns of yarn to pile up to prevent the transfer tails from unwinding when the packages are removed from the winding spindle. Following this the cams move the bars at a rate to cause the turns of yarn to be laid side by side on the core until it drops off shoulder 198 and is picked up by guides 21. Shaft 210 is rotated through one complete revolution at the start of each winding cycle by means of a worm wheel 216 fixedly carried by said shaft 210 and meshed with a worm gear 218 carried by shaft 220. Shaft 220 is journaled in bearings 222 and 224 formed on bracket member 226 which in turn is fixedly secured to bed or table 10. Shaft 220 is adapted to be rotated by means of V-belt 228 connecting pulley 230, carried by line shaft 18, to clutch pulley 232, carried by shaft 220.

Clutch pulley 232 is adapted to be engaged during the reset cycle of the apparatus so that upon the start of the winding cycle, line shaft 18 rotates shaft 220 and through worm and worm wheel 218 and 216 respectively cams 206 and 208 are rotated to move tail-winding guide operating bars 82 and 83. Clutch pulley 232 comprises a spring backed free flange and hub 234 carried by shaft 220 for rotation thereon and flange 236 keyed to shaft 220 for sliding movement longitudinally thereof. Flange 236 is provided with a shifter mechanism comprising a grooved sleeve 238 fixedly secured to flange 236. A bell crank lever 240 is mounted for swinging movement on stud 242 carried by bracket 226. The uppermost end of bell crank lever 240 is bifurcated to form a yoke 244 which extends around grooved sleeve 238 and is provided with inwardly facing pins 246 which extend into the groove on sleeve 238 so that pivotal movement of bell crank lever 240 in a counterclockwise direction as viewed in Fig. 13 will move keyed flange 236 towards free flange 234 to thereby grip the belt 228 between said two flanges under compressive influence of spring 235 so that the power transmitted by said belt will rotate shaft 220. The other end of bell crank lever 240 is provided with a cam follower 248 adapted to be engaged by cam 250 to rock said lever 240 in a counterclockwise direction. Cam 250 is mounted on, and adapted to freely rotate on, a shaft 252 which is suitably journaled for rotation in bed or table 10. One end of shaft 252 extends through said bed or table 10 to the front of the apparatus and the other end of said shaft extends from the back of said bed or table. Cam 250 is provided with a cam surface 254 adapted to engage cam follower 248 upon actuation of cam 250, to rock bell crank lever 240, a stop shoulder 256 adapted to engage cam follower 248 to position said cam surface 254 relative to cam follower 248 when said cam is at rest, and a pawl engaging shoulder 258. A cam actuating lever 260 is fixedly attached to shaft 252 adjacent cam 250 and carries at its free end cam actuating pawl 262. A lever 264, Figs. 8 and 12, is fixedly attached intermediate its ends to the end of shaft 252 at the front of said machine. The uppermost end of lever 264 is connected to the end of pressure control bar 142 by means of a pin 266 on lever 264 engaging a slot 268 formed in tail-winding guide operating bar resetting member 270 carried by pressure control bar 142. It will, therefore, be seen that longitudinal movement of pressure control bar 142 in either direction will rock lever 264 and shaft 252. When pressure control bar 142 is returned from its "doff" position to its starting position by rail 152 on cam carrying plate 146 it rocks lever 264 and shaft 252 to engage clutch pulley 232 in the manner to be described hereinafter. A tension spring 265, having its ends connected to bed or table 10 and to lever 264 maintains cam following roller 154 on pressure control bar 142 in engagement with cam following rail 150, after clutch pulley 232 has been engaged, to eliminate any "backlash" that might be present in the cam slot formed by rails 150 and 152.

Clutch pulley 232 is normally in an open or disengaged position as illustrated in Figs. 12 and 13 when a transfer-tail is not being wound. A spring 272 having one of its ends attached to a pin 274 on bracket member 226 and its other end attached to a finger 276 upstanding from one arm of yoke 244 moves said clutch pulley 232 from engaged to disengaged position and holds it thus disengaged. A latch mechanism is provided for holding clutch pulley 232 engaged upon belt 228 to cause shaft 210 to make one complete revolution and to release said clutch pulley upon the completion of one revolution of shaft 210. This latching mechanism comprises a latching bar 278, Figs. 12 and 13, pivotally mounted on bracket member 226 by means of stub shaft 279 and having its free end adjacent yoke 244 of bell crank lever 240. Latching bar 278 is provided with a latch shoulder 280 adjacent its free end that is adapted to cooperate with an adjustable stop member 282 carried by the yoke 244. A clutch-controlling and latch-disengaging wheel 284 is fixedly attached to shaft 210 adjacent latching bar 278. The periphery of wheel 284 is provided with a notch 286 adapted to receive rider 288 carried by a lug 290 formed on the upper arm of bell crank lever 240. A latching bar disengaging pin 292 is carried by wheel 284 so as to project beneath said latching lever 278 in a position to engage the under-side of said latching lever to disengage latch shoulder 280 from stop member 282 as said wheel 284 rotates with shaft 210.

The end of tail-winding guide operating bar 82 is provided with a reset pin 294 adapted to be engaged by resetting shoulder 296 on member 270 as pressure control bar 142 moves traverse frames 19 to their "doff" position to thereby pull tail-winding guide operating bar 82 towards the tail-end of the apparatus to reset the supplementary or tail-winding yarn guide and to bring abutments 80 into engagement with breakage levers 52. Journals 139 that carry bars 82 and 142 adjacent the tail-end of the apparatus are provided with a pair of spring clips 298 and 300. Bar 82 is provided with two bar retaining pins 302 and 304. As bar 82 is returned to its tail-winding position, by means of member 270 and pressure control bar 142, retaining pin 304 is pulled out of spring clip 300 and retaining pin 302 is pulled into spring slip 298 to thereby hold bar 82 until it is positively moved by cam 206 reacting against pin 212. Bar 83 is similarly reset by pin 295 thereon being engaged by resetting shoulder 297 on member 271 carried by pressure control bar 144.

The tail-winding guide operating mechanism functions in the following manner. As pressure control bar 142 moves towards the tail-end of the machine during the "doff" cycle of the apparatus, shoulder 296 engages reset pin 294 on the end of bar 82 and pulls said bar 82 with it until, at the end of its stroke, cam follower 212 is against or adjacent the low point of cam 206 and bar retaining pin 302 is engaged within spring clip 298. This "doff" movement of pressure control bar 142 also pivots lever 264 in a counterclockwise direction, as viewed in Fig. 8, to thereby rock shaft 252. The rocking of shaft 252 swings cam actuating lever 260 upwardly to bring cam actuating pawl 262 above pawl engaging shoulder 258 of cam 250. After the apparatus has been threaded in the above described manner, motor 188 drives pressure control bar 142 towards the head-end of the machine in the manner above described to reset the apparatus for the next winding cycle. This forward, or resetting, motion of pressure control bar 142 rocks lever 264 in a clockwise direction, as seen in Fig. 8, to cause cam actuating lever 260 to swing downwardly to thereby bring cam actuating pawl 262 into engagement with pawl engaging shoulder 258. After pawl 262 engages shoulder 258, continued movement of lever 260 rocks cam 250 with shaft 252 to cause cam surface 254 to lift cam follower 248 and thereby rock bell crank lever 240 in a counterclockwise direction, as viewed in Fig. 13. The counterclockwise rotation of bell crank lever 240 causes yoke 244 and pins 246 to move flange 236 of clutch pulley 232 to engage belt 228 so that when motor 22 is started to start the winding cycle, the tail-winding mechanism will be actuated. As yoke 244 engages pulley clutch 232, stop member 282 passes beyond latch shoulder 280 on latching bar 278 to permit said latching bar to drop and thereby latch clutch pulley 232 in engagement with belt 228. The counterclockwise rotation of bell crank lever 240 also withdraws rider 288 from the notch 286 in clutch-controlling and latch disengaging wheel 284 so that said wheel 284 is free to rotate with shaft 210. As latch shoulder 280 and stop member 282 come into latching engagement the tail 263 of cam actuating pawl 262 engages pawl releasing stud 306 to disengage said pawl 262 from shoulder 258 to permit cam 250 to fall back in a clockwise direction, as viewed in Fig. 13, until its stop shoulder 256 engages cam follower 248.

When motor 22 is started to commence the winding cycle of the apparatus, clutch pulley 232 causes shaft 220 to be rotated. This rotation of shaft 220 by means of worm 218 and worm wheel 216, rotates shaft 210. Cams 206 and 208 rotate with shaft 210 to move their respective tail-winding guide operating bars 82 and 83 through the first 180° of rotation of said shaft, or until the high points on cams 206 and 208 have passed cam followers 212 and 214. At that time tail-winding guide operating bars 82 and 83 have traveled their full distance and are locked against accidental movement by having their bar retaining pins 304 engaged by spring clips 300.

The first few degrees of rotation of wheel 284 moves notch 286 from under rider 288. Shortly thereafter latching bar disengaging pin 292 contacts the lower edge of latching bar 278 and lifts said latching bar to disengage latch shoulder 280 from stop member 282. When this occurs clutch pulley 232 is prevented from disengaging belt 228 by reason of rider 288 contacting the periphery of wheel 284 to prevent bell crank lever 240 from pivoting far enough in a clockwise direction to disengage said clutch pulley. When one complete revolution of shaft 210 has been completed, notch 286 passes under rider 288 permitting said rider to drop into said notch under the influence of spring 272 to thereby disengage the clutch pulley 232 and stop the operation of tail-winding mechanism.

Figure 15:
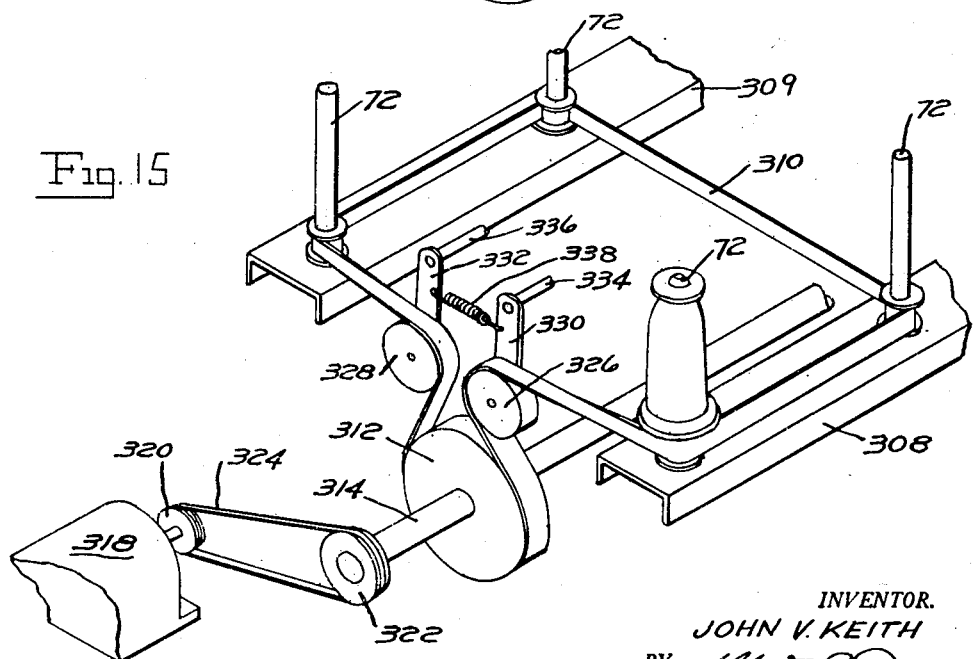
Fig. 15 is a somewhat diagrammatic view illustrating the means for driving the twisting spindles.

*Twisting mechanism.*—A plurality of twisting spindles 72, Fig. 15, one twisting spindle for each winding spindle 16 and 17, are mounted in any convenient manner on a pair of parallel rails 308 and 309 running longitudinally of the apparatus and supported by legs 12. Spindles 72 are preferably driven in groups of four by means of a spindle driving tape 310. Tape 310 is preferably driven by a pulley 312 carried by spindle driving shaft 314. Spindle driving shaft 314 extends longitudinally of the apparatus substantially midway between front and back legs 12 and is suitably journaled in bearings mounted on cross-braces 316, Fig. 3, extending between said front and back legs. Shaft 314 is driven by a reversible twister motor 318 acting through pulleys 320 and 322 carried respectively by the shaft of motor 318 and spindle driving shaft 314 and belt 324. Spindle driving tape 310 passes around pulley 312 on shaft 314 and then passes around an idler pulley 326. After leaving idler pulley 326, tape 310 is twisted 90° and passes around the whorls of two spindles 72 carried by rail 308. After leaving the second spindle on rail 308, tape 310 crosses to rail 309 and passes around the whorls of two spindles located thereon and then passes over idler pulley 328 before returning to pulley 312. Idler pulleys 326 and 328 are rotatably carried on the lower ends of a pair of pivoted arms 330 and 332 respectively carried for pivotal movement on a pair of parallel rods 334 and 336 which extend longitudinally of the apparatus. Arms 330 and 332 are spring loaded for movement towards each other by means of a spring 338 having one of its ends connected to arm 330 and its other end connected to arm 332 to permit idler pulleys 326 and 328 to also function as a tensioning means for spindle driving tape 310. It will be understood that each group of four twisting spindles 72 throughout the length of the apparatus is driven by a similar spindle driving arrangement.

Conventional single twist type spindles have been disclosed in Fig. 15 to illustrate the manner in which the twisting spindles may be driven. It will be understood by those skilled in the art that any convenient type of uptwisting spindle either single or multiple twist, may be substituted for the single twist spindles illustrated in Fig. 15, and a multiple twist spindle is illustrated diagrammatically at 340 in Fig. 14. If multiple twist spindles are employed with the apparatus embodying the present invention they can be driven in the same manner as the single twist spindles illustrated in Fig. 15, or they can be driven in any convenient and well known manner, as for example, by individual motors.

*Tension control mechanism.*—It is important in winding a package of yarn that the tension of the yarn as it is wound not exceed certain maximum values and that the tension be reduced as the package increases in diameter. Excessive tension is likely to damage the yarn and/or distort the package causing poor package quality and the likelihood that the yarn will not deliver freely from the package in subsequent processes. Inasmuch as the present apparatus winds a package in conjunction with a twisting spindle wherein a loop of the yarn is rotated by the twisting spindles in a "balloon" as twist is imparted thereto, it is desirable to provide a means for relieving the unduly high tension that results from the centrifugal effect of the "balloon." It is especially necessary to provide some form of tension relieving mechanism when the twisting spindle employed is of the multiple twist variety inasmuch as this type spindle develops a considerably larger balloon than single twist spindles and, therefore, imposes a higher tension on the yarn.

Figure 14:
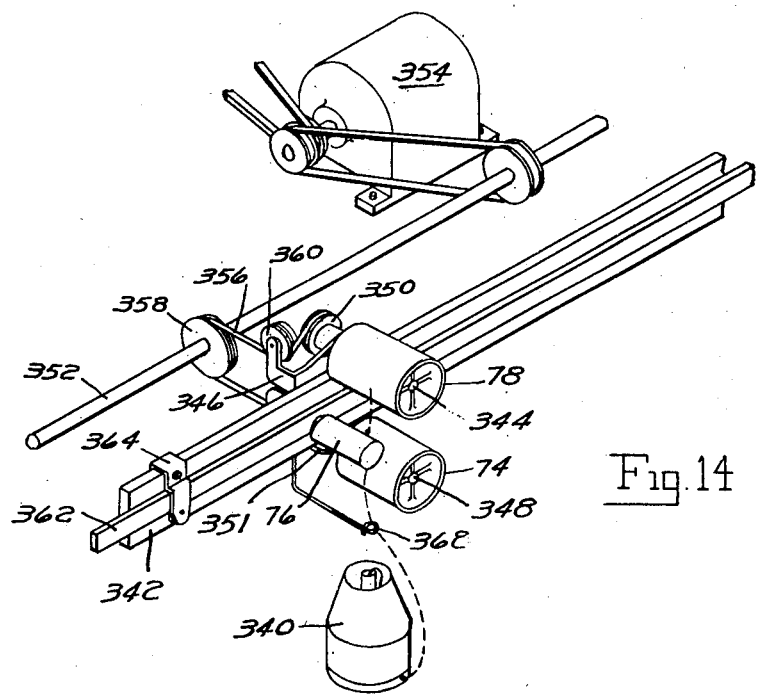
Fig. 14 is a somewhat diagrammatic view illustrating the tension relieving mechanism.

A preferred embodiment of a tension relieving mechanism is illustrated diagrammatically in Fig. 14 and is shown in place on the apparatus in Fig. 8. The mechanism comprises a horizontal rail or support 342 extending along the front of the apparatus. Spaced along said rail 342 and located beneath each winding spindle 16 are sets of tension controlling rollers 74, 76 and 78. Rollers 74 and 78 are mounted on the bottom and top respectively of said rail 342 and project forwardly from said rail for rotation about parallel horizontal axes. Roller 78 is mounted on a horizontal shaft 344 rotatably journaled in a bracket 346 secured to the rear of rail 342. Roller 74 is similarly mounted on a horizontal shaft 348 also carried by bracket 346. A pulley 350 is carried by shaft 344 adjacent the back of bracket 346 and a similar pulley 351 is carried by shaft 348. A shaft 352 extends parallel to and in back of rail or support 342 and is suitably journaled on bed or table 10 for rotation by motor 354. Rollers 74 and 78 are positively driven in a clockwise direction as viewed in Figs. 8 and 14, at a peripheral speed equal to or slightly in excess of the speed at which the strand of yarn will be wound on winding spindle 16, by means of a belt 356 which, after passing around pulley 358 on shaft 352, passes under idler pulley 360 mounted on bracket 346 which permits belt 356 to change its direction 90° to pass around pulley 350 on shaft 344. After leaving pulley 350, belt 356 passes around the pulley 351 on shaft 348 and then passes under a second idler pulley, not shown, similar to idler pulley 360 which permits belt 356 to change its direction once again to return to pulley 358.

Pressure control rollers 76 are carried by pressure control bar 362 slidably journaled on rail 342 by means of hanger members 364. The tail end of pressure control bar 362 is located adjacent the lower end of lever 264, Fig. 8, and has mounted thereon connecting member 366. A pin 269 on the lower end of lever 264 engages in a slot or groove 367, in connecting member 366 to permit swinging movement of lever 264 to move tension control bar 362 in an axial direction. It will, therefore, be seen that as pressure control bar 142 moves towards the tail end of the apparatus in the course of a winding cycle, it pivots lever 264 in a counterclockwise direction, as viewed in Fig. 8, and that such pivotal movement of lever 264 will move tension control bar 362 towards the head end of the apparatus. Pressure control rollers 76 are so located on tension control bar 362 that when the apparatus is in the position illustrated in Fig. 8, i. e. about to commence the winding cycle, the periphery of roller 76 is slightly past a line drawn tangent to the two rollers 74 and 78. As winding progresses, rollers 76 are progressively moved between rollers 74 and 78. Strand of yarn Y, as it is threaded up prior to starting winding cycle, passes from spindle 72 through a guide or eye 368 located above spindle 72 and then passes between rollers 74 and 78 and roller 76. After leaving the surface of roller 78, strand of yarn Y continues upwardly and onto spindle 16. It will, therefore, be seen that as winding progresses and roller 76 is moved between rollers 74 and 78 strand of yarn Y will be wrapped an increasing amount around the peripheries of said rollers 74 and 78 so that rollers 74 and 78 will thereby increasingly reduce the tension on that length of yarn between winding spindle 16 and roller 78 as the package increases in diameter.

A similar tension controlling mechanism is carried by the back side of the apparatus to control the tension of yarn wound on spindles 17. The only difference in the tension controlling mechanism on the back of the machine is the direction in which its tension controlling bar moves i. e. it moves towards the tail end of the apparatus instead of towards the head. Also, the lever 267 which actuates the tension control bar on the back of the machine differs from lever 264 only in the respect that it is free on shaft 252 inasmuch as it will be pivoted by back pressure control bar 144 in a direction contra to the rotation of shaft 252.

*Controls.*—The various mechanisms included in the preferred embodiment of the apparatus incorporating the present invention have been described above. It is necessary that these various mechanisms cooperate one with the other simultaneously in some instances and consecutively in others, and to insure the proper sequence of operations, the control mechanisms described hereinafter are employed.

Assuming the apparatus has been threaded and is in condition to start twisting and winding a plurality of packages of yarn on the winding spindles 16 and 17, the first phase in the operation of the mechanism requires the starting of twister motor 318 to bring twister spindles 72 up to their predetermined desired speed, following which the take-up motor 22 and tension control motor 354 are started. It is desirable that said spindles 72 be rotating at their normal running speed before winding spindles 16 and 17 start winding the strands of yarn being twisted by spindles 72 so that at least the major portion of the yarn wound into the transfer-tail will have included therein all of the turns of twist that are desired. Inasmuch as an appreciable length of time is required for an electric motor to attain its operating speed, the first step in starting the apparatus is to start twister motor 318. After a predetermined time interval, during which motor 318 and spindles 72 come up to speed, motor 22 and tension relieving motor 354 are started. When the packages wound on winding spindles 16 and 17 have been completed, the three motors 22, 318 and 354 are stopped, and motor 188 is started to rapidly move traverse frames 19 and 20 away from spindles 16 and 17 to the "doff" position. When the "doff" position is reached, motor 188 is stopped, the wound packages are removed from winding spindles 16 and 17, empty package cores are placed thereon, and the apparatus is threaded for the next twisting and winding cycle, following which motor 188 is started in a reverse direction to return traverse frames 19 and 20 to their starting position. After traverse frames 19 and 20 are back to their starting position, the twisting and winding cycle is ready to commence again.

Figure 16:
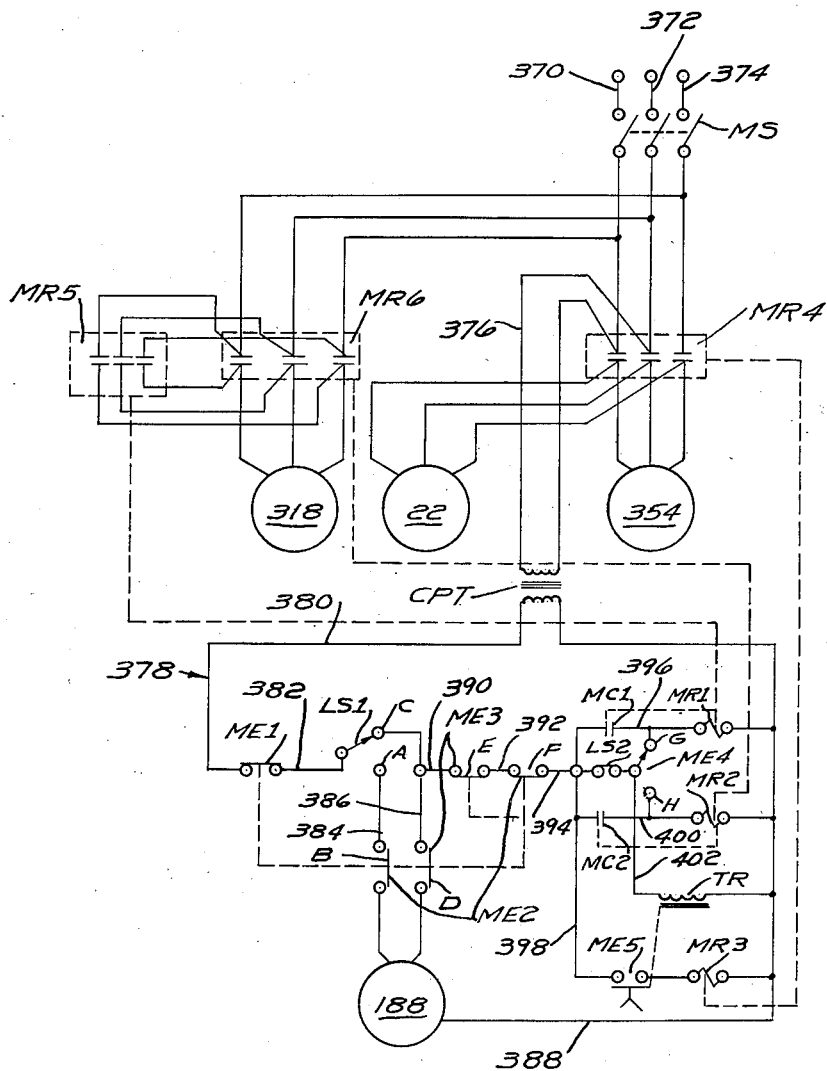
Fig. 16 is a wiring diagram of the apparatus embodying the present invention.

Fig. 16 is a wiring diagram illustrating the manner in which the electrical controls for the above described apparatus function. Motors 22, 318 and 354 are preferably high voltage polyphase motors and receive their power directly from main power lines 370, 372 and 374. Power lines 370, 372 and 374 are provided with master switch MS. A branch circuit 376 is taken off main power lines 370 and 372 to provide a source of single phase current which is stepped down by means of control power transformer CPT to provide a low voltage single phase current across its secondary for use in actuating a control circuit 378 for motors 22, 318 and 354 and for driving motor 188. A conductor 380 extends from one pole of control power transformer CPT to one side of a single pole single throw switch ME1 which serves as an on-off switch for said control circuit. A conductor 382 connects the second terminal of switch ME1 to the common pole of a single pole double throw switch LS1. A conductor 384 connects terminal A of the double pole side of switch LS1 to one terminal of side B of a double pole double throw switch ME2. The other terminal of side B of switch ME2 is connected to the reverse coil of motor 188. A conductor 386 connects terminal C of the double pole side of switch LS1 to one terminal of side D of a double pole double throw switch ME3, and the other terminal of side D is connected to the forward coil of motor 188. A conductor 388 connects motor 188 to the other secondary terminal of control power transformer CPT. A tap 390 is taken off conductor 386 and connected to one terminal of side E of double pole double throw switch ME3, and the other terminal of side E is connected by means of conductor 392 to one terminal of side F of double pole double throw switch ME2. The other terminal of side F is connected by means of conductor 394 to one side of a single pole single throw limit switch LS2. The other terminal of switch LS2 is connected to the common pole terminal of a single pole double throw twist selector switch ME4. A circuit 396 branches from conductor 394 and connects conductor 394 to conductor 388, through maintaining contact MC1 and relay MR1. Terminal G of the double pole side of twist selector switch ME4 is connected to circuit 396 between maintaining contact MC1 and relay MR1. A circuit 398 connects conductor 394 to conductor 388 through the switch ME5 and relay MR3 of a time delay relay. A circuit 400, including maintaining contact MC2 and relay MR2, connects circuit 398 ahead of switch ME5 to conductor 388. Terminal H of the double pole side of twist selector switch ME4 is connected to circuit 400 between maintaining contact MC2 and relay MR2. A conductor 402 connects the common pole terminal of twist selector switch ME4 to the timer element TR of the time delay relay which includes switch ME5 and relay MR3. The other side of timer element TR is connected to conductor 388. Master contactor MR4 makes or breaks the connection between main power lines 370, 372 and 374 and motors 22 and 354 and is operated by relay MR3. The power from main power lines 370, 372 and 374 to twister motor 318 is controlled by master contactors MR5 and MR6 which are operated by relays MR1 and MR2 respectively to operate twister motor 318 in either a forward or reverse direction depending upon the position of twist selector switch ME4.

It will, therefore, be seen that when main power switch MS is closed and double pole double throw switch ME3 is positioned to close the contacts on its side D and open its contacts on side E and switch LS1 is positioned to contact its terminal C, closing switch ME1 will cause motor 188 to operate in a first direction to rapidly elevate cam carrying plates 146 to move traverse frames 19 and 20 to their "doff" position. When side B of double pole double throw switch ME2 is closed and its side F is open, and switch LS1 is positioned to contact its terminal A, motor 188 will operate in a reverse direction to lower cam carrying plates 146 and thereby return traverse frames 19 and 20 to their start position. When switch LS1 is positioned to contact its terminal C and double pole double throw switches ME2 and ME3 are positioned to close their sides E and F and limit switch LS2 is closed, closing switch ME1 will cause control current to pass through either relay MR1 or relay MR2 depending upon the position of twist selector switch ME4. If twist selector switch ME4 is positioned to pass the control current to its terminal G, relay MR1 will be activated to close master contactor MR5 to start twister motor 318 rotating in one direction. At the same time relay MR1 will close maintaining contact MC1 to thereby bypass limit switch LS2 so that subsequent opening of said switch LS2 will not remove holding current from relay MR1 and motor 318 will continue to operate until either switch ME1 is opened or limit switch LS2 is moved from its terminal C to its terminal A. If twist selector switch ME4 is positioned to contact its terminal H, then relay MR2 is activated and relay MR1 remains idle. Relay MR2 closes master contactor MR6 to cause twister motor 318 to rotate in the opposite direction and at the same time relay MR2 closes maintaining contact MC2 to prevent opening of master contactor MR6 upon the subsequent opening of limit switch LS2. At the same time that either of the relays MR1 or MR2 is activated, control current passes along conductor 402 to timer element TR of a time delay relay. After a predetermined interval of time, timer element TR closes switch ME5 of the time delay relay to thereby permit control current to pass through circuit 398 to thereby activate relay MR3 to cause it to close master contactor MR4 and thereby start motors 22 and 354.

For convenience in operating the above described apparatus, switches ME1, ME2 and ME3 are grouped together and are mounted on extension 26 of bed or table 10 and are provided with a single selector handle 424 which will operate said switches to bring about, together with switches LS1 and LS2 which are opened and/or closed automatically by the operation of the apparatus, the desired start, stop, doff and reset cycles of said apparatus. Twist selector switch ME4 is located on the face of electrical control box 426, which contains main power master switch MS, master contactors MR4, MR5 and MR6, relays MR1 and MR2, maintaining contacts MC1 and MC2, and the time delay relay which includes timer element TR, switch ME5 and relay MR3. Twist selector switch ME4 is operated only on those occasions when the apparatus is being changed from imparting twist in one direction to imparting twist in the other direction, i. e. when changing from imparting an S twist to imparting a Z twist. When such a changeover is made, operation of twist selector switch ME4 will cause twister motor 318 to operate in either a forward or reverse direction to thereby rotate twister spindles 72 in the proper direction to impart the desired twist to the yarn.

As set forth above, limit switches LS1 and LS2 are mounted on bridging member 168 in a position to be operated by switch actuating cam 408 which in turn is rotated by cam carrying plate 146 at each end of its vertical movement. Limit switch LS2 is a single pole single throw switch whose function is to prevent twister motor 318 and take-up motor 22 from being started in the event cam carrying plate 146 fails to return to its lowermost position to bring yarn guides 21 against or closely adjacent package cores carried by spindles 16 and 17. Therefor switch LS2 is closed when its actuating arm 406 is depressed by the shoulder 422 simultaneously with or immediately after the actuating arm 404 of limit switch LS1 moving off from the end of keeper member 414. Limit switch LS1 is a single pole double throw switch which functions to control the direction of rotation and stopping of doff-reset motor 188 and to complete or break the circuit controlling the starting and stopping of motors 22, 318 and 354. When cam carrying plate 146 is in its lowermost position, as illustrated in Fig. 2, limit switch LS1 is positioned to make contact with its terminal C, Fig. 16, to permit motor 188 to operate in a doffing direction when switch ME3 is properly set or to permit motors 22, 318 and 354 to start if switches ME2 and ME3 are in the correct positions and switch ME1 is closed. Regardless of whether cam carrying plate 146 is being elevated by motor 188, in a doff cycle, or by motor 22, in a winding cycle, when said cam carrying plate reaches its uppermost limit of travel, switch LS1 will be tripped to break the contact with its terminal C and make contact with its terminal A. This actuation of switch LS1 will stop further elevation of cam carrying plate 146 and permit said cam carrying plate to be lowered to starting position by the proper setting of switch ME2. When cam carrying plate 146 reaches its lowermost position, limit switch LS1 is tripped in the opposite direction to stop motor 188 and position said switch LS1 for starting motors 22, 318 and 354.

Switches ME1, ME2 and ME3 are mounted side by side in a single row on a bracket 430 which is mounted on extension 26 of bed or table 10. A four position selector comprising the selector handle 424 mounted on the end of actuator shaft 428 rotatably journaled in bracket 430, and provided with means to permit only clockwise rotation thereof, operates switches ME1, ME2 and ME3 by means of switch-operating cams 432, 434 and 436 carried by said actuator shaft 428 to successively stop the apparatus, start motor 188 to move traverse frames 19 and 20 to doff position, start motor 188 in a reverse direction to rest said traverse frames, and to start motors 22, 318 and 354. In addition to carrying switch-operating cams 432, 434 and 436, actuator shaft 428 also carries clutch operating cam 438. Clutch-operating cam 438 is so located on actuator shaft 428 that its periphery is engaged by the end of clutch-operating bell crank lever 132, Figs. 2 and 6. The periphery of clutch-operating cam 438 is so formed that as shaft 428 is rotated to close side D of switch ME3 to start motor 188 for its doff cycle, cam 438 will rock bell crank lever 132 to disengage clutch member 128 from clutch member 130 just prior to motor 188 starting. Clutch-operating cam 438 holds clutch members 128 and 130 disengaged until after motor 188 has been stopped at the end of the reset cycle by opening side B of switch ME2.

The above described controls operate in the following manner. Assume that the reset cycle has been completed and that switch actuating cam 408 has tripped limit switch LS1 to stop the reverse rotation of motor 188 and to reset said switch LS1 on its terminal C and that it has closed limit switch LS2. Selector handle 424 is moved from its "reset" position to its "start" position to first engage clutch members 128 and 130 and then to open sides B and D of switches ME2 and ME3 respectively and to close their sides E and F by means of switch-operating cams 434 and 432 to permit current to reach either relay MR1 or relay MR2, depending upon the position of twist selector switch ME4, to thereby start twister motor 318 and to activate time delay relay TR to start take-up motor 22 and tension control motor 354 a predetermined interval of time after twister motor 318 starts. After packages of yarn have been wound to the desired sizes on spindles 16 and 17, selector handle 424 is moved from its "start" position to its "stop" position. This movement of selector handle 324 causes switch-operating cam 436 to open switch ME1 to thereby remove the holding current from relays MR1 or MR2 and time delay relay TR to thereby open master contactors MR4 and MR5 or MR6 to stop motors 22, 318 and 354. Selector handle 424 is then rotated to its "doff" position to cause clutch-operating cam 438 to rock bell crank lever 132 to thereby disengage clutch members 128 and 130 to cause switch-operating cam 432 to close side D and open side E of switch ME3, and to cause switch-operating cam 436 to close switch ME1 to start motor 188. When cam carrying plate 146 reaches its uppermost position switch-actuating cam 408 trips switch LS1 to break its contact with terminal C to thereby stop motor 188 and to make contact with its terminal A. After all of the wound packages of yarn have been removed from spindles 16 and 17 and empty package cores replaced on said spindles and the threaded yarn to be twisted and wound has been properly threaded on the apparatus selector handle 424 is rotated to its "reset" position to cause switch-operating cam 432 to open side D and close side E of switch ME3 and to cause switch-operating cam 434 to close side B and open side F of switch ME2 to start motor 188 in a reverse direction to lower cam carrying plates 146 and 147 to their start position.

*Method of operation.*—The operation of the various mechanisms included in the above described apparatus has been described in detail in connection with the description of those mechanisms; therefore the following description of the mode of operation of said apparatus will be limited to a general description of the overall operation. If the apparatus has been threaded up and traverse frames 19 and 20 returned to position yarn guides 21 against or adjacent empty package cores carried by spindles 16 and 17 and the apparatus otherwise in condition to start its twisting and winding cycle, i. e. the apparatus has completed its "reset" cycle, the following operations will take place in one complete cycle of the apparatus. Selector handle 424 is rotated to its "start" position to first engage clutch members 128 and 130, Figs. 2 and 6, by means of clutch-operating cam 438 and bell crank lever 132 and to actuate double pole double throw switches ME2 and ME3 to disconnect reset motor 188 and to connect either relay MR1 or MR2, depending upon the position of twist selector switch ME4, and timer element TR of the time delay relay to conductor 386. The movement of selector handle 424 to the start position therefore causes twister motor 318 to start rotating and to bring twister spindles 72 up to speed following which timer element TR closes switch ME5 of the time delay relay to start take-up motor 22 and tension relieving motor 354. Rotation of motor 22 drives line shaft 18 to rotate take-up spindles 16 and 17 and to reciprocate yarn guides 21 adjacent thereto. Line shaft 18 also rotates shaft 210 of the transfer-tail winding mechanism, Figs. 12 and 13, and cams 206 and 208 carried thereby by means of belt 228, clutch pulley 232 and worm wheel and worm 216 and 218 respectively. Cams 206 and 208 react against tail-winding guide operating bars 82 and 83 to move said bars longitudinally of the apparatus, bar 82 towards the head end and bar 83 towards the tail end of the apparatus. Bars 82 and 83 acting through operating rods 204, Figs. 7 and 8, slowly rotate yarn-engaging and traversing levers 200 to cause a transfer-tail to be wound at the base of each package core and to release the strands of yarn Y following the winding of the transfer-tails to permit their being picked up by yarn guides 21. After the strands of yarn have been released by the yarn-engaging and traversing levers 200, continued longitudinal movement of the bars 82 and 83 moves abutments 80 carried thereby away from the breakage levers 52 of each winding unit after the slack occasioned by the release of the yarn by lever 200 has been taken up by the winding spindles. After shaft 210 and cams 206 and 208, Figs. 12 and 13, have rotated through 180°, bars 82 and 83 have been moved through the full extent of their travel and bar retaining pins 304 are engaged in spring clips 300 to restrain said bars against accidental movement. Cams 206 and 208 and shaft 210 continue to rotate until they complete one complete revolution at which time rider 288 drops in notch 286 on clutch-controlling and latch-disengaging wheel 284 to disengage clutch pulley 232 to disconnect the tail winding mechanism from line shaft 18.

Power from motor 22 is also transmitted to lead screws 138 and 140 by means of belt 88, speed reducing unit 94, denier change gears 116, 118 and 120 and sprocket chain 134, Figs. 2, 3, 4 and 5, to rotate said lead screws 138 and 140. Rotation of lead screws 138 and 140 elevate cam carrying plates 146 and 147 to cause the cam forming rails carried thereby to move pressure control bar 142 longitudinally of the apparatus towards its tail-end and pressure control bar 144 towards its head end. The contour of the cam forming rails carried by cam carrying plates 146 and 147 is such that by employing the proper combination of denier change gears 116, 118 and 120 the pressure control bars 142 and 144 are moved by said cam grooves at a speed substantially equal to the rate at which the radius of the packages being wound increases. Therefore, by connecting said pressure control bars to traverse frames 19 and 20 by means of arms 158, the traverse frames and the yarn guides 21 carried thereby are positively moved away from the package at substantially the same rate as the package grows so that substantially no undesirable pressure is imposed upon the periphery of the package being wound.

Pressure control bars 142 and 144 acting through levers 264 and 267, Figs. 8 and 12, move tension control bars 362 longitudinally of the apparatus to move tension control rollers 76, carried by said tension control bar 362, between tension control rollers 74 and 78. Rollers 74 and 78 are rotated by tension control motor 354 at a peripheral speed slightly greater than the lineal speed of the strand of yarn Y being wound. Movement of roller 76 between rollers 74 and 78 wraps the strand of yarn Y around an increasingly greater portion of rollers 74 and 78 as the winding cycle progresses so that as the packages being wound increase in diameter, the tension of the yarn being wound thereon decreases.

The movement of pressure control bar 142 acting through rack bar 162 and pinion gear 164 rotates spiral cam 170 which in turn rocks gear segment 172. Gear segment 172 drives sprocket wheel 182 and sprocket chain 184. Sprocket chain 184 moves the speed control mechanism of motor 22 to slow down said motor 22 as the packages of yarn being wound on spindles 16 and 17 increase in diameter to maintain the peripheral speed of those packages substantially constant throughout the package growth.

In the event any strand of yarn Y breaks during the twisting and winding cycle, breakage lever 52 will pivot in a counterclockwise direction until abutment 66 on its upper end is engaged by star wheel 54, Figs. 9, 10 and 11 to disengage the clutch in the winding unit 14 to thereby stop the rotation of spindle 16 or 17 and the reciprocation of yarn guide 21.

It will, therefore, be seen that moving selector handle 424 to the "start" position causes twister motor 318 to start and come up to speed, causes take-up motor 22 and tension control motor 354 to start after twister motor 318 is substantially up to speed, and that motor 22 in addition to rotating spindles 16 and 17 and reciprocating yarn guides 21, also operates the tail-winding mechanism, the pressure control mechanism and the mechanism for continuously reducing its own speed to maintain the lineal speed of the yarn being wound constant.

After the packages of yarn wound on spindles 16 and 17 attain their desired size, selector handle 424 is moved to its "stop" position to thereby open switch ME1 to stop take-up motor 22, twister motor 318 and tension control motor 354. After the apparatus is stopped, selector handle 424 is moved to its "doff" position to separate clutch members 128 and 130, close side D and open side E of switch ME3 and close switch ME1 to start motor 188 to rapidly rotate lead screws 138 and 140 to thereby swing traverse frames 19 and 20 away from the fully wound packages to facilitate their removal from spindles 16 and 17 and to facilitate the placement of empty package cores on said spindles and threading up the apparatus. The doff cycle of the apparatus also causes reset members 270 and 271, Fig. 12, on pressure control bars 142 and 144 respectively to engage pins 294 and 295 on tail-winding guide operating bars 82 and 83 to reset said operating bars. Resetting bars 82 and 83 rotates yarn engaging and traversing levers 200, through operating rods 204, in a clockwise direction, as viewed in Fig. 7, to reset the supplementary or tail-winding yarn guide 192 in condition to wind a transfer-tail.

Figure 5:
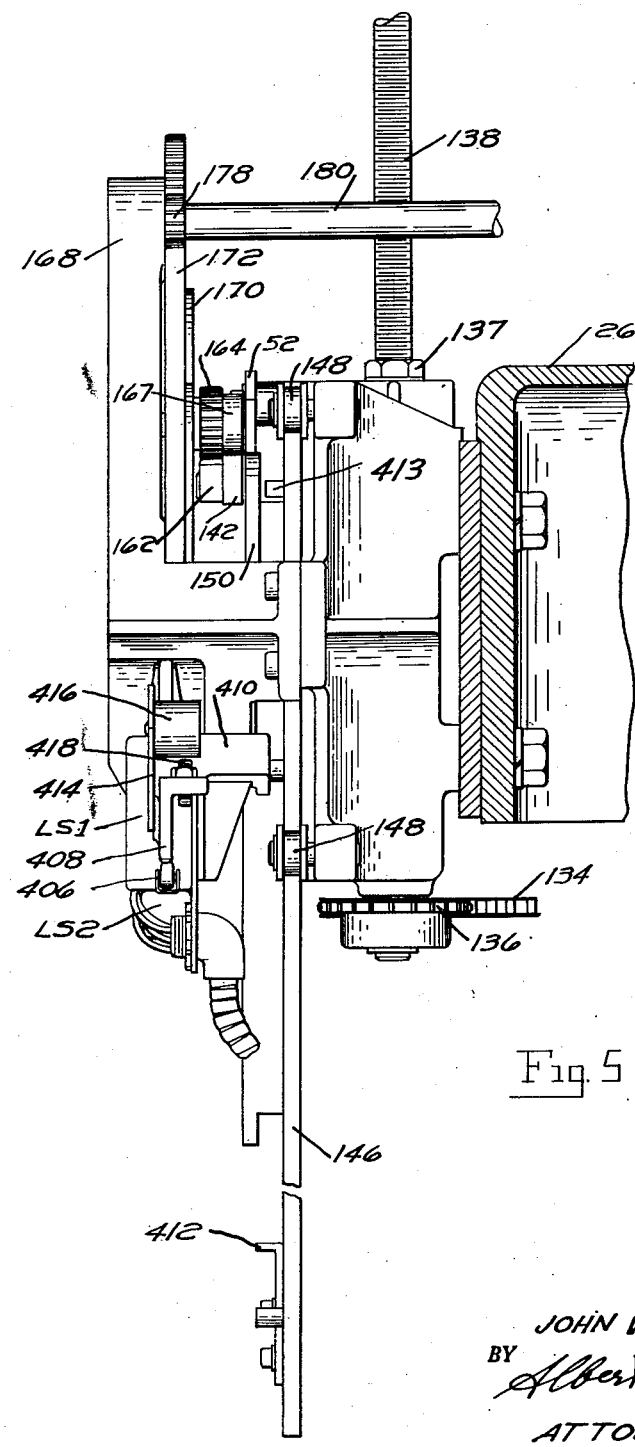
Fig. 5 is a fragmentary sectional view taken on the line V—V of Fig. 2.
Figure 6:
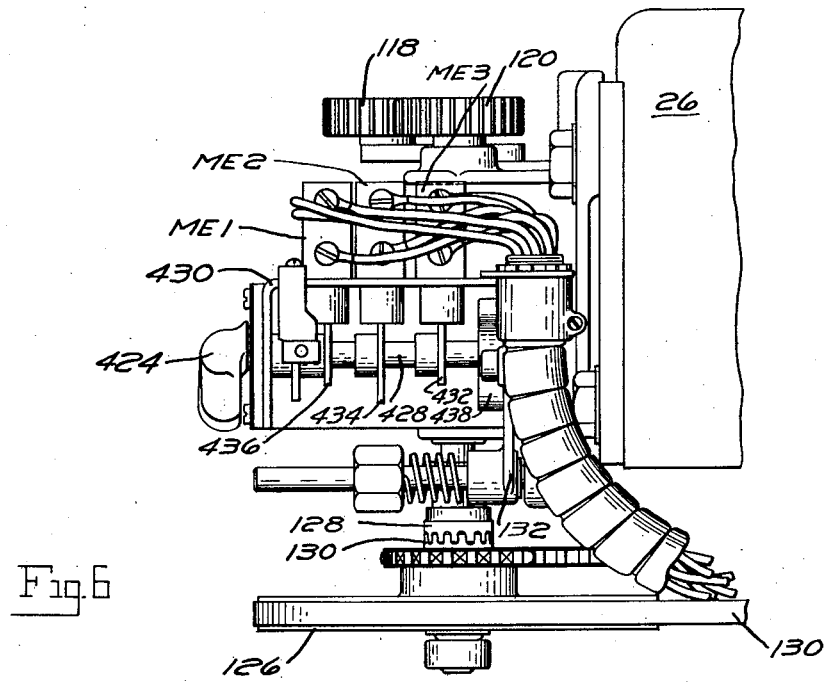
Fig. 6 is an enlarged fragmentary end view of the control mechanism.
Figure 7:
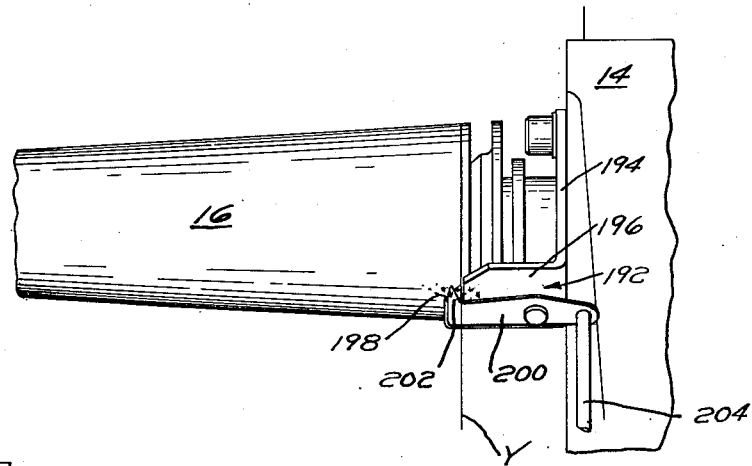
Fig. 7 is a fragmentary view illustrating a part of the tail winding mechanism.

When cam carrying plate 146 reaches its uppermost position during the doff cycle, switch actuating cam 408, Figs. 2 and 5, is rotated by shoulder 412 of cam carrying plate 146 to thereby manipulate limit switch LS1 to break its contact with its terminal C and make contact with its terminal A to stop motor 188 and condition the control circuit 378 for the reverse rotation of said motor 188.

It will be noted that it is the movement of cam carrying plate 146, acting through switch actuating cam 408, which operates limit switch LS1. Therefore, in the event the operator of the apparatus neglects to stop it when the packages have reached their desired size the continued upward movement of cam carrying plate 146 will actuate limit switch LS1 to thus break the circuit to motor 22 and stop the apparatus.

After all of the spindles have been threaded, selector handle 424 is moved to its "reset" position to close side B and open side F of switch ME2 and to open side D and close side E of switch ME3 to cause motor 188 to rotate in a reverse direction to rapidly rotate lead screws 138 and 140 in a reverse direction whereby they lower cam carrying plates 146 and 147 to return pressure control bars 142 and 144, traverse frames 19 and 20, tension controlling rollers 76, and the speed control for motor 22 to their starting position. Return of pressure control bar 142 to its starting position causes it to swing lever 264, Figs. 8, 12 and 13, to thereby rock shaft 252 and by means of cam 250 and bell crank lever 240 engage clutch pulley 232. As cam carrying plate 146 reaches its lowermost position actuating cam 408, Fig. 2, is rotated to close limit switch LS2 and trip limit switch LS1 to condition control circuit 378 to start motors 22, 318, and 354 and to stop reset motor 188.

Since certain changes may be made in the above apparatus without departing from the scope of the invention herein involved, it is intended that all matter contained in the above description or shown in the accompanying drawings shall be interpreted as illustrated and not in a limiting sense.

What is claimed is:

1. In a winding machine the combination comprising a plurality of winding units, each winding unit including a spindle and a yarn guide, a source of power for rotating said spindles and traversing said yarn guides adjacent said spindles to wind strands of yarn on cores carried by said spindles to form packages of yarn thereon, the spindle and yarn guide of each winding unit being mounted thereon for movement relative to each other so as to be capable of separating as the package being wound increases in diameter, a single cam driven by said source of power, a member moved by said cam to positively separate the spindles and yarn guides of said plurality of winding units at a rate substantially equal to the increase in the radius of the packages being wound, and speed control means actuated by said cam for controlling said source of power to change the speed of rotation of said spindles.

2. In a winding machine the combination comprising a plurality of winding units each winding unit including a front and back spindle and a front and back yarn guide, a source of power for rotating said spindles and traversing said yarn guides adjacent said spindles to wind strands of yarn on cores carried by said spindles to form packages of yarn thereon, the front spindle and front yarn guide and back spindle and back yarn guide of each winding unit being mounted thereon for movement relative to each other so as to be capable of separating as the package being wound increases in diameter, a pair of cams driven by said source of power, a member moved by one of said cams to positively separate the front spindles and yarn guides of said plurality of winding units at a rate substantially equal to the increase in the radius of the packages being wound, a second member moved by the other cam to positively separate the back spindles and yarn guides of said plurality of winding units at a rate substantially equal to the increase in the radius of the packages being wound, and means actuated by one of said cams for controlling said source of power to decrease the speed of rotation of said spindles to cause the strands of yarn to be wound at a substantially constant yarn speed.

3. In a winding machine the combination comprising a spindle, a first source of power for rotating said spindle to wind a strand of yarn on a core carried by said spindle to form a package of yarn thereon, a yarn guide for traversing the strand of yarn lengthwise of said core, said spindle and said yarn guide being mounted on said machine for movement relative to each other so as to be capable of separating as the package being wound increases in diameter, movable means for positively separating said spindle and yarn guide at a rate substantially equal to the increase in the radius of the package being wound when it is moved in a first direction, a second source of power capable of driving said movable means in the opposite direction, and clutch means for alternately connecting said first source of power to said movable means to move it in said first direction and disconnecting said second source of power therefrom, and disconnecting said first source of power from said movable means and connecting said second source of power thereto.

4. In a precision winding machine the combination comprising a winding spindle, a first source of power for rotating said spindle to wind a strand of yarn on a core carried thereby to form a package thereon, a yarn guide for traversing a strand of yarn lengthwise of said core a predetermined number of times for each revolution of said spindle, means mounting said yarn guide for pivotal movement towards and away from said spindle, movable means for positively moving said yarn guide away from said spindle at a rate substantially equal to the increase in the radius of the package being wound when it is moved in a first direction, a second source of power capable of driving said movable means in the opposite direction, and clutch means for alternately connecting said first source of power to said movable means to move it in said first direction and disconnecting said second source of power therefrom, and disconnecting said first source of power from said movable means and connecting said second source of power thereto.

5. In a winding machine the combination comprising a plurality of winding units, each winding unit including a spindle and a yarn guide, a first source of power for rotating said spindles and traversing said yarn guides adjacent said spindles to wind strands of yarn on cores carried by said spindels to form packages of yarn thereon, the spindle and yarn guide of each winding unit being mounted thereon for movement relative to each other so as to be capable of separating as the package being wound increases in diameter, a cam movable in a first direction to positively separate the spindles and yarn guides of said plurality of winding units at a rate substantially equal to the increase in the radius of the packages being wound, a second source of power capable of moving said cam in the opposite direction, and clutch means for alternately connecting said first source of power to said cam to move it in said first direction and disconnecting said second source of power therefrom, and disconnecting said first source of power from said cam and connecting said second source of power thereto.

6. In a winding machine the combination comprising a spindle, a source of power for rotating said spindle to wind a strand of yarn on a core carried by said spindle to form a package of yarn thereon, a yarn guide for traversing a strand of yarn lengthwise of said core, said spindle and said yarn guide being mounted on said machine for movement relative to each other so as to be capable of separating as the package being wound increases in diameter, means for positively separating said spindle and said yarn guide at a rate substantially equal to the increase in the radius of the package being wound, a supplementary yarn guide located adjacent said spindle and positioned to engage said strand of yarn at the start of a winding cycle to wind a transfer-tail, and means for moving said supplementary guide whereby it traverses said strand of yarn to form said transfer-tail and to release said strand of yarn at the completion thereof, said separating means being positioned to engage and move said moving means in an opposite direction at the end of the winding cycle to reset said supplementary guide.

7. In a winding machine the combination comprising a spindle, a source of power for rotating said spindle to wind a strand of yarn on a core carried by said spindle to form a package of yarn thereon, a yarn guide for traversing a strand of yarn lengthwise of said core, said spindle and said yarn guide being mounted on said machine for movement relative to each other so as to be capable of separating as the package being wound increases in diameter, means for positively separating said spindle and said yarn guide at a rate substantially equal to the increase in the radius of the package being wound, a supplementary yarn guide including a pivoted member having a yarn engaging hook thereon located adjacent said spindle and positioned to engage said strand of yarn at the start of a winding cycle to wind a transfer-tail, and means for pivoting said pivoted member to cause said hook to release said strand of yarn, said separating means being positioned to engage and move said pivoting means in an opposite direction at the end of the winding cycle to reset said supplementary guide.

8. In a winding machine the combination comprising a plurality of winding units, each winding unit including a spindle and a yarn guide, a source of power for rotating said spindles and traversing said yarn guides adjacent said spindles to wind strands of yarn on cores carried by said spindles to form packages of yarn thereon, the spindle and yarn guide of each winding unit being mounted thereon for movement relative to each other so as to be capable of separating as the package being wound increases in diameter, movable means for positively separating the spindles and yarn guides of a plurality of winding units at a rate substantially equal to the increase in the radius of the packages being wound, a supplementary yarn guide located adjacent each winding spindle each said supplementary guide positioned to engage the strand of yarn being wound by its respective spindle at the start of a winding cycle to wind a transfer-tail, and means for simultaneously moving a plurality of said supplementary guides to cause them to traverse the strands of yarn to form transfer-tails and to release said strands at the completion thereof, said separating means being positioned to engage and move said moving means at the end of the winding cycle to reset said supplementary guides.

9. In a winding machine the combination comprising a spindle, a source of power, disengageable coupling means for releasably connecting said source of power to said spindle to rotate said spindle to wind a strand of yarn on a core carried thereby to form a package of yarn thereon, latch means associated with said coupling means to maintain said coupling means in position to connect said source of power to said spindle, a movable member positioned to be engaged by a winding strand of yarn and held in one position thereby and upon breakage or exhaustion of said strand of yarn to move to a second position wherein it releases said latch means to permit said coupling means to disconnect said source of power from said spindle, and a shiftable element engageable with said movable member at the start of the winding cycle to prevent movement thereof until said strand of yarn is in condition to prevent said member from moving to its latch releasing position.

10. In a winding machine the combination comprising a plurality of winding units, each winding unit including a spindle and a disengageable coupling means for releasably connecting each spindle with a source of power whereby each spindle can be rotated to wind a strand of yarn on a core carried by said spindle to form a package of yarn thereon, latch means cooperating with each coupling means to maintain said coupling means in position to connect said spindles to a source of power, a movable member associated with each latch member and each being positioned to be engaged by a strand of yarn being wound by its associated spindle and held in one position thereby and upon breakage or exhaustion of said strand of yarn to move to a second position wherein it releases its latch means to permit said coupling means to disconnect its associated spindle from a source of power, and a shiftable element engageable with a plurality of movable members at the start of a winding cycle to prevent latch disconnecting movement thereof until said strands of yarn are in condition to prevent such latch disconnecting movement.

11. In a winding machine the combination comprising a spindle, a source of power, disengageable coupling means for releasably connecting said source of power to said spindle to rotate said spindle to wind a strand of yarn on a core carried thereby to form a package of yarn thereon, latch means associated with said coupling means to maintain said coupling means in position to connect said source of power to said spindle, a movable member positioned to be engaged by a winding strand of yarn and held in one position thereby and upon breakage or exhaustion of said strand of yarn to move to a second position wherein it releases said latch means to permit said coupling means to disconnect said source of power from said spindle, a supplementary yarn guide located adjacent said spindle and positioned to engage said strand of yarn at the start of a winding cycle to wind a transfer-tail and to release said strand of yarn upon the completion of said transfer-tail, and a shiftable element engageable with said movable member at the start of the winding cycle to prevent movement thereof and shiftable out of engagement with said movable member after said strand of yarn has been released from said supplementary yarn guide.

12. In a winding machine the combination comprising a spindle, a source of power, disengageable coupling means for releasably connecting said source of power to said spindle to rotate said spindle to wind a strand of yarn on a core carried thereby to form a package of yarn thereon, latch means associated with said coupling means to maintain said coupling means in position to connect said source of power to said spindle, a movable member positioned to be engaged by a winding strand of yarn and held in one position thereby and upon breakage or exhaustion of said strand of yarn to move to a second position wherein it releases said latch means to permit said coupling means to disconnect said source of power from said spindle, a supplementary yarn guide located adjacent said spindle and positioned to engage said strand of yarn at the start of a winding cycle to wind a transfer-tail and to release said strand of yarn upon the completion of said transfer-tail, and a shiftable element engageable with said movable member at the start of the winding cycle to prevent said member from moving to its latch releasing position and shiftable to actuate said supplementary yarn guide and to move out of engagement with said member after said strand of yarn has been released by said supplementary yarn guide.

13. In a winding machine the combination comprising a plurality of winding units, each winding unit including a spindle, a yarn guide and a disengageable coupling means for releasably connecting each spindle with a source of power whereby each spindle can be rotated to wind a strand of yarn on a core carried by said spindle to form a package of yarn thereon, latch means cooperating with each coupling means to maintain said coupling means in position to connect said spindles to a source of power, a movable member associated with each latch member and each being positioned to be engaged by a strand of yarn being wound by its respective spindle and held in one position thereby and upon breakage or exhaustion of said strand of yarn to move to a second position wherein it releases its latch member to permit said coupling means to disconnect said spindle from a source of power, a supplementary yarn guide located adjacent each winding spindle each positioned to engage the strand of yarn being wound by its respective spindle at the start of a winding cycle to wind a transfer-tail, and means for moving a plurality of said supplementary guides to cause them to traverse the strands of yarn to form transfer-tails and to release said strand at the completion thereof, said moving means being engageable with a plurality of movable members at the start of a winding cycle to prevent latch disconnecting movement thereof until said strands of yarn have been released from said supplementary yarn guides.

14. In a winding machine the combination comprising a spindle, a source of power, disengageable coupling means for releasably connecting said source of power to said spindle to rotate said spindle to wind a strand of yarn on a core carried thereby to form a package of yarn thereon, a yarn guide for traversing a strand of yarn lengthwise of said core, said spindle and said yarn guide being mounted on said machine for movement relative to each other so as to be capable of separating as the package being wound increases in diameter, latch means associated with said coupling means to maintain said coupling means in position to connect said source of power to said spindle, a movable member positioned to be engaged by a winding strand of yarn and held in one position thereby and upon breakage or exhaustion of said strand of yarn to move to a second position wherein it releases said latch means to permit said coupling means to disconnect said source of power from said spindle, a supplementary yarn guide located adjacent said spindle and positioned to engage said strand of yarn at the start of a winding cycle to wind a transfer-tail and to release said strand of yarn upon the completion of said transfer-tail, a shiftable element engageable with said movable member at the start of the winding cycle to prevent said member from moving to its latch releasing position and shiftable to actuate said supplementary yarn guide and to move out of engagement with said movable member after said strand of yarn has been released by said supplementary yarn guide, and means for positively separating said spindle and said yarn guide as the winding cycle progresses, said separating means being positioned to engage and move said shiftable element into position to engage said movable member and to reset said supplementary yarn guide at the end of the winding cycle.

15. In a winding machine the combination comprising a plurality of winding units, a source of power, each winding unit including a spindle, a yarn guide and a disengageable coupling means for releasably connecting each spindle with said source of power to rotate each spindle to wind a strand of yarn on a core carried by said spindle to form a package of yarn thereon, the spindle and yarn guide of each winding unit being mounted thereon for movement relative to each other so as to be capable of separating as the package being wound increases in diameter, latch means cooperating with each coupling means to maintain said coupling means in position to connect said spindles to said source of power, a movable member associated with each latch member and each being positioned to be engaged by a winding strand of yarn and held in one position thereby and upon breakage or exhaustion of said strand of yarn to move to a second position wherein it releases its latch means to permit said coupling means to disconnect the spindle associated therewith from said source of power, a supplementary yarn guide located adjacent each winding spindle each positioned to engage the strand of yarn being wound by its respective spindle at the start of a winding cycle to wind a transfer-tail and to release said strand of yarn upon the completion of said transfer-tail, a shiftable element engageable with a plurality of said movable members at the start of the winding cycle to prevent said members from moving to their latch releasing position and shiftable to actuate said supplementary yarn guide and to move out of engagement with said movable member after said strand of yarn has been released by said supplementary yarn guide, and means for positively separating said spindles and said yarn guides as the winding cycle progresses, said separating means being positioned to engage and move said shiftable element into position to engage said movable members and to reset said supplementary yarn guides at the end of the winding cycle.

16. In a machine for twisting and winding yarn the combination comprising a twisting spindle, a motor for rotating said twisting spindle, a winding spindle, a motor for rotating said winding spindle to wind a strand of yarn twisted by said twisting spindle on a core carried by said winding spindle to form a package of yarn thereon, a yarn guide for traversing a strand of yarn twisted by said twisting spindle lengthwise of said core, said winding spindle and said yarn guide being mounted on said machine for movement relative to each other so as to be capable of separating as the package being wound increases in diameter, means to positively separate said winding spindle and said yarn guide at a rate substantially equal to the increase in the radius of the package being wound, means for controlling said second mentioned motor to decrease the speed of rotation of said winding spindle to cause said twisted strand of yarn to be wound at a substantially constant yarn speed, means to start said first mentioned motor, and means actuated by said last mentioned means for starting said second mentioned motor a predetermined time interval after said twisting spindle starts to rotate.

17. In a machine for twisting and winding yarn the combination comprising a twisting spindle, a motor for rotating said twisting spindle, a winding spindle, a motor for rotating said winding spindle to wind a strand of yarn twisted by said twisting spindle on a core carried by said winding spindle to form a package of yarn thereon, a yarn guide for traversing a strand of yarn twisted by said twisting spindle lengthwise of said core, said winding spindle and said yarn guide being mounted on said machine for movement relative to each other so as to be capable of separating as the package being wound increases in diameter, means to positively separate said winding spindle and said yarn guide at a rate substantially equal to the increase in the radius of the package being wound, means actuated by said separating means for controlling said second mentioned motor to decrease the speed of rotation of said winding spindle to cause said twisted strand of yarn to be wound at a substantially constant yarn speed, means to start said first mentioned motor, and means actuated by said last mentioned means for starting said second mentioned motor a predetermined time interval after said twisting spindle starts to rotate.

18. In a winding machine the combination comprising a spindle, a source of power for rotating said spindle to wind a strand of yarn on a core carried by said spindle to form a package of yarn thereon, a yarn guide for traversing a strand of yarn lengthwise of said core, said spindle and said yarn guide being mounted on said machine for movement relative to each other so as to be capable of separating as the package being wound increases in diameter, means to positively separate said spindle and said yarn guide at a rate substantially equal to the increase in the radius of the package being wound, means for controlling said source of power to decrease the speed of rotation of said spindle to cause said strand of yarn to be wound at a substantially constant yarn speed, and tension control means engageable by said strand of yarn and operable by said separating means to reduce the tension in the strand of yarn being wound as the winding cycle progresses.

19. In a winding machine the combination comprising a spindle, a source of power for rotating said spindle to wind a strand of yarn on a core carried by said spindle to form a package of yarn thereon, a yarn guide for traversing a strand of yarn lengthwise of said core, said spindle and said yarn guide being mounted on said machine for movement relative to each other so as to be capable of separating as the package being wound increases in diameter, means to positively separate said spindle and said yarn guide at a rate substantially equal to the increase in the radius of the package being wound, means for controlling said source of power to decrease the speed of rotation of said spindle to cause said strand of yarn to be wound at a substantially constant yarn speed, and tension control means comprising a driven roller engageable by said strand of yarn, and a movably mounted roller engageable with said strand of yarn and movable by said separating means to increase the wrap of said yarn around said driven roller as the winding cycle progresses.

20. In a machine for twisting and winding yarn the combination comprising a twisting spindle, a motor for rotating said twisting spindle, a winding spindle, a motor for rotating said winding spindle to wind a strand of yarn twisted by said twisting spindle on a core carried by said winding spindle to form a package of yarn thereon, a yarn guide for traversing a strand of yarn twisted by said twisting spindle lengthwise of said core, said winding spindle and said yarn guide being mounted on said machine for movement relative to each other so as to be capable of separating as the package being wound increases in diameter, means to positively separate said winding spindle and said yarn guide at a rate substantially equal to the increase in the radius of the package being wound, means actuated by said separating means for controlling said second mentioned motor to decrease the speed of rotation of said winding spindle to cause said twisted strand of yarn to be wound at a substantially constant yarn speed, tension control means engageable by said strand of yarn and operable by said separating means to reduce the tension in the twisted strand of yarn being wound, means to start said first mentioned motor, and means actuated by said last mentioned means for starting said second mentioned motor a predetermined time interval after said twisting spindle starts to rotate.

21. In a machine for twisting and winding yarn the combination comprising a twisting spindle, a motor for rotating said twisting spindle, a winding spindle, a motor for rotating said winding spindle to wind a strand of yarn twisted by said twisting spindle on a core carried by said winding spindle to form a package of yarn thereon, a yarn guide for traversing a strand of yarn twisted by said twisting spindle lengthwise of said core, said winding spindle and said yarn guide being mounted on said machine for movement relative to each other so as to be capable of separating as the package being wound increases in diameter, means to positively separate said winding spindle and said yarn guide at a rate substantially equal to the increase in the radius of the package being wound, means actuated by said separating means for controlling said second mentioned motor to decrease the speed of rotation of said winding spindle to cause said twisted strand of yarn to be wound at a substantially constant yarn speed, tension control means comprising a driven roller engageable by said strand of yarn, a movably mounted roller engageable with said strand of yarn and movable by said separating means to increase the wrap of said yarn around said driven roller as the winding cycle progresses, means to start said first mentioned motor, and means actuated by said last mentioned means for starting said second mentioned motor a predetermined time interval after said twisting spindle starts to rotate.

22. In a machine for twisting and winding yarn the combination comprising a twisting spindle, a motor for rotating said twisting spindle, a winding spindle, a motor for rotating said winding spindle to wind a strand of yarn twisted by said twisting spindle on a core carried by said winding spindle to form a package of yarn thereon, a yarn guide for traversing a strand of yarn twisted by said twisting spindle lengthwise of said core, said winding spindle and said yarn guide being mounted on said machine for movement relative to each other so as to be capable of separating as the package being wound increases in diameter, means to positively separate said winding spindle and said yarn guide at a rate substantially equal to the increase in the radius of the package being wound, means actuated by said separating means for controlling said second mentioned motor to decrease the speed of rotation of said winding spindle to cause said twisted strand of yarn to be wound at a substantially constant yarn speed, tension control means comprising a driven roller engageable by said strand of yarn, a motor for rotating said roller, a movably mounted roller engageable with said strand of yarn and movable by said separating means to increase the wrap of said yarn around said driven roller as the winding cycle progresses, means to start said first mentioned motor, and means actuated by said last mentioned means for starting said second mentioned motor and said third mentioned motor a predetermined time interval after said twisting spindle starts to rotate.

23. In a winding machine the combination comprising a plurality of winding units, each winding unit including a spindle and a yarn guide, a source of power for rotating said spindles and traversing said yarn guides adjacent said spindles to wind strands of yarn on cores carried by said spindles to form packages of yarn thereon, the spindles and yarn guide of each winding unit being mounted thereon for movement relative to each other so as to be capable of separating as the package being wound increases in diameter, a single mechanism driven by said source of power for positively separating the spindles and yarn guides of said plurality of winding units at a rate substantially equal to the increase in the radius of the packages being wound, and speed control means actuated by said mechanism for controlling said source of power to change the speed of rotation of said spindles.

24. In a winding machine the combination comprising a spindle, a first source of power for rotating said spindle to wind a strand of yarn on a core carried by said spindle to form a package of yarn thereon, a yarn guide for traversing the strand of yarn lengthwise of said core, said spindle and said yarn guide being mounted on said machine for movement relative to each other so as to be capable of separating as the package being wound increases in diameter, movable means for positively separating said spindle and yarn guide at a rate substantially equal to the increase in the radius of the package being wound when it is moved in a first direction, a second source of power capable of driving said movable means in the opposite direction, clutch means for alternately connecting said first source of power to said movable means to move it in said first direction and disconnecting said second source of power therefrom, and disconnecting said first source of power from said movable means and connecting said second source of power thereto, and speed control means actuated by said movable means for controlling said source of power to change the speed of rotation of said spindle.

References Cited in the file of this patent
UNITED STATES PATENTS

| | | |
|---|---|---|
| 1,988,067 | Zinselmeyer | Jan. 15, 1935 |
| 2,048,787 | Elvin et al. | July 28, 1936 |
| 2,084,975 | Katz | June 22, 1937 |
| 2,093,820 | Siegenthaler | Sept. 21, 1937 |
| 2,104,809 | O'Dowd | Jan. 11, 1938 |
| 2,104,810 | O'Dowd | Jan. 11, 1938 |
| 2,108,410 | Perry | Feb. 15, 1938 |
| 2,171,993 | Reichelt | Sept. 5, 1939 |
| 2,328,344 | Jones | Aug. 31, 1943 |
| 2,335,975 | Stahl et al. | Dec. 7, 1943 |
| 2,354,185 | Deitz | July 25, 1944 |
| 2,373,066 | Theiler | Apr. 3, 1945 |
| 2,396,662 | Kinsella | Mar. 19, 1946 |
| 2,466,600 | Lawson | Apr. 5, 1949 |

(Other references on following page)

UNITED STATES PATENTS

| | | |
|---|---|---|
| 2,481,031 | McDermott | Sept. 6, 1949 |
| 2,486,031 | Jencks | Oct. 25, 1949 |
| 2,517,625 | Bauer et al. | Aug. 8, 1950 |
| 2,541,746 | Cochran | Feb. 13, 1951 |
| 2,545,534 | Truitt | Mar. 20, 1951 |
| 2,568,960 | Kershaw | Sept. 25, 1951 |
| 2,570,469 | McDermott | Oct. 9, 1951 |
| 2,618,441 | Marcellus | Nov. 18, 1952 |
| 2,630,976 | Keight | Mar. 10, 1953 |